June 16, 1942.　　D. S. BENNETCH　　2,286,193
FULL AUTOMATIC AUTOMOTIVE TRANSMISSION
Filed July 17, 1937　　17 Sheets-Sheet 1

*Fig. 1.*

INVENTOR
David S. Bennetch,
BY Albert M. Austin
ATTORNEY

June 16, 1942. D. S. BENNETCH 2,286,193
FULL AUTOMATIC AUTOMOTIVE TRANSMISSION
Filed July 17, 1937 17 Sheets-Sheet 2

INVENTOR
David S. Bennetch.
BY
Albert M. Austin
ATTORNEY

June 16, 1942.　　　D. S. BENNETCH　　　2,286,193
FULL AUTOMATIC AUTOMOTIVE TRANSMISSION
Filed July 17, 1937　　　17 Sheets-Sheet 3
*Fig:3.*
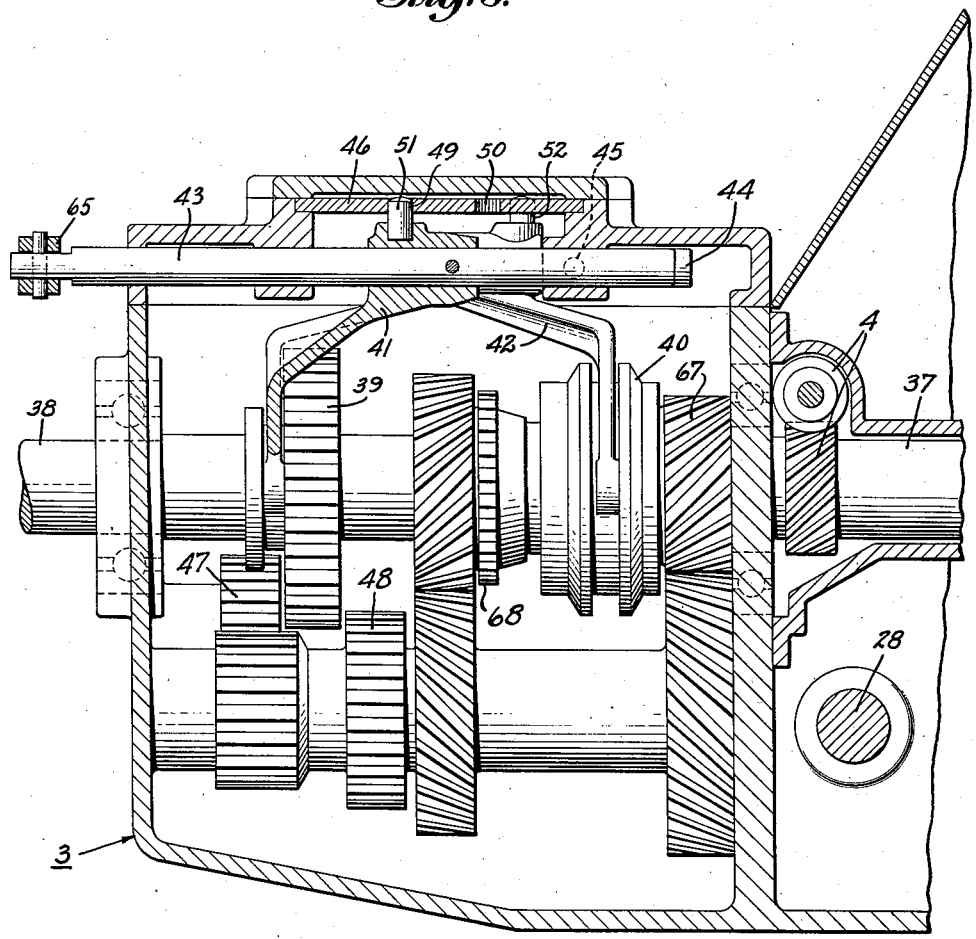
*Fig:5.*
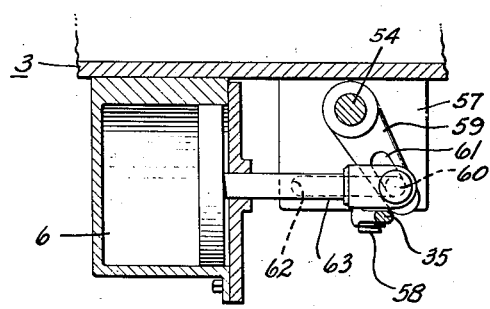
INVENTOR
David S. Bennetch.
BY
Albert M. Austin
ATTORNEY June 16, 1942.  D. S. BENNETCH  2,286,193
FULL AUTOMATIC AUTOMOTIVE TRANSMISSION
Filed July 17, 1937     17 Sheets-Sheet 5
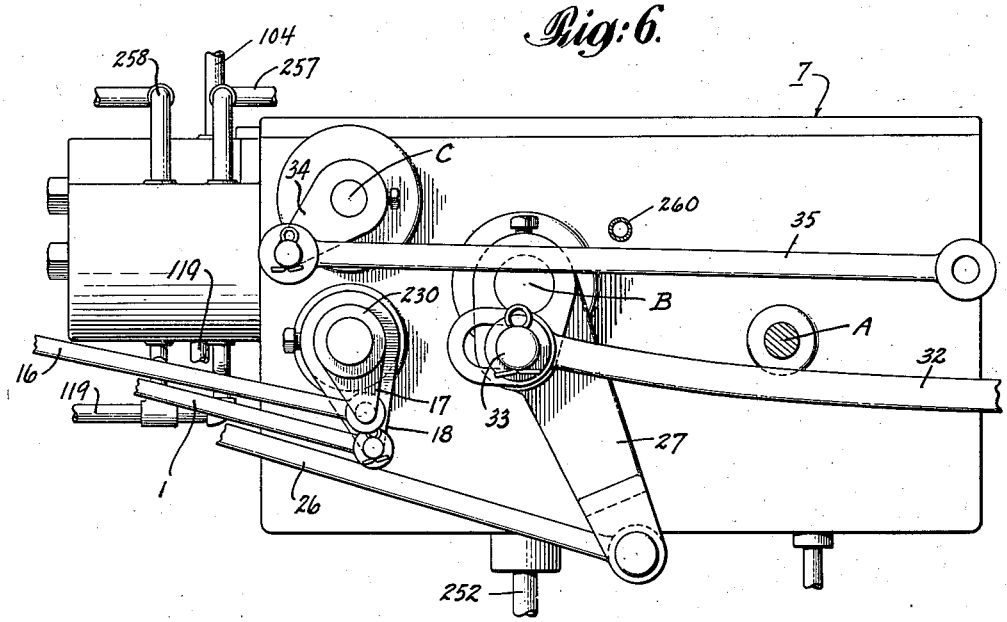
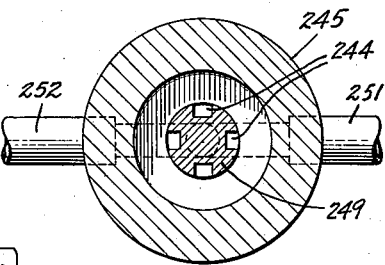
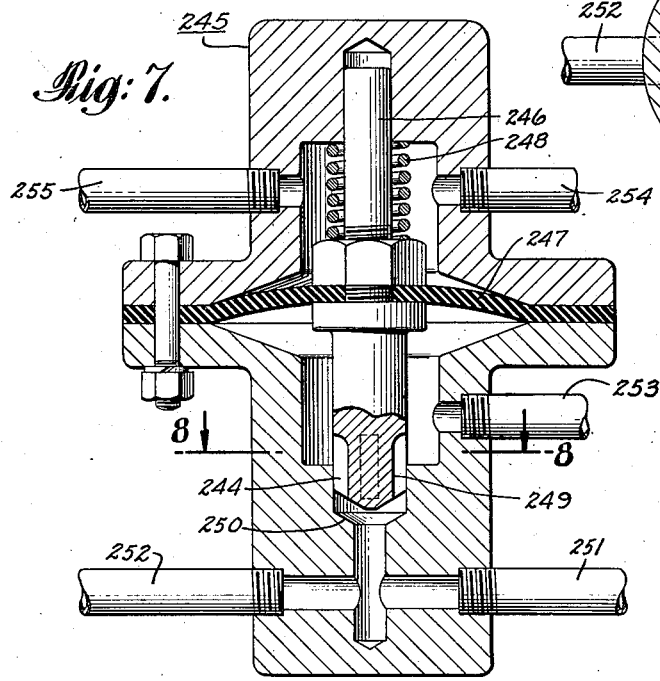
INVENTOR
David S. Bennetch.
BY
Albert M. Austin
ATTORNEY

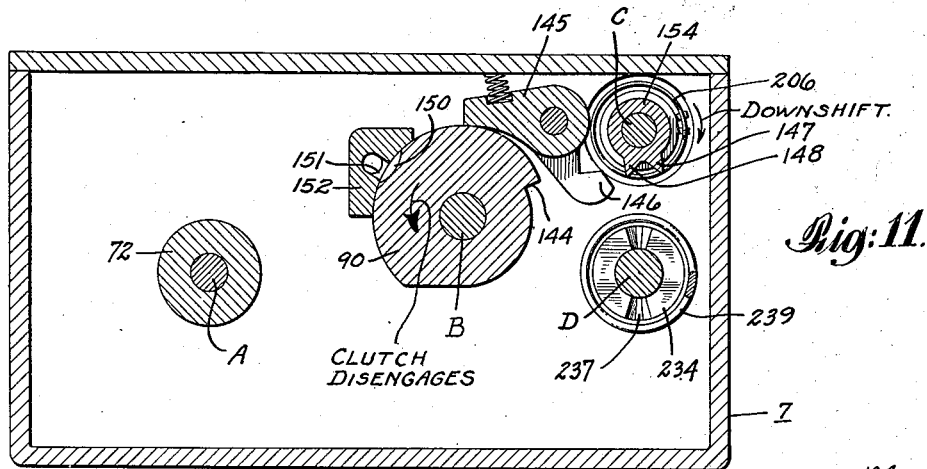
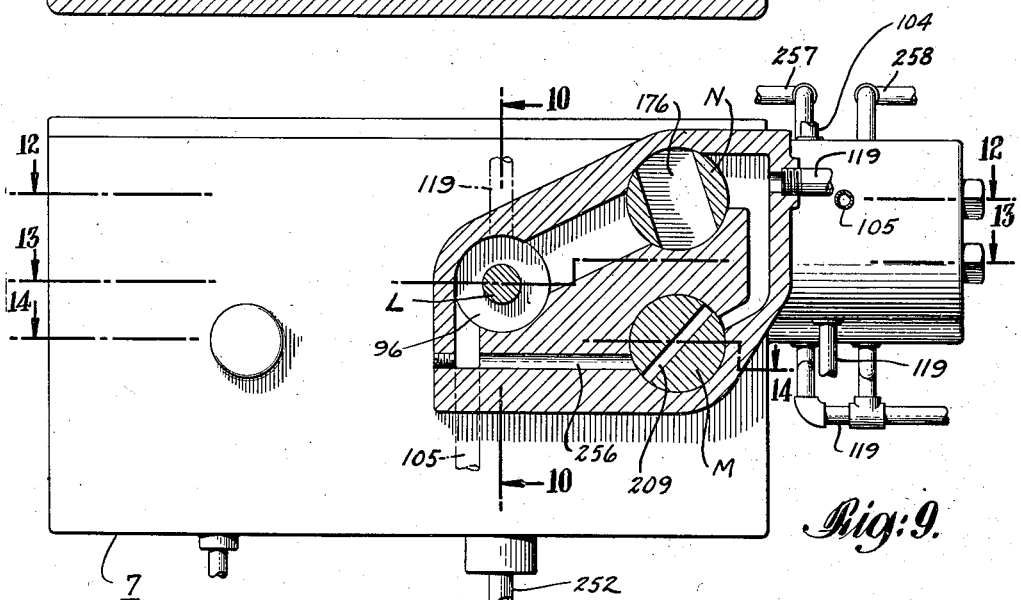
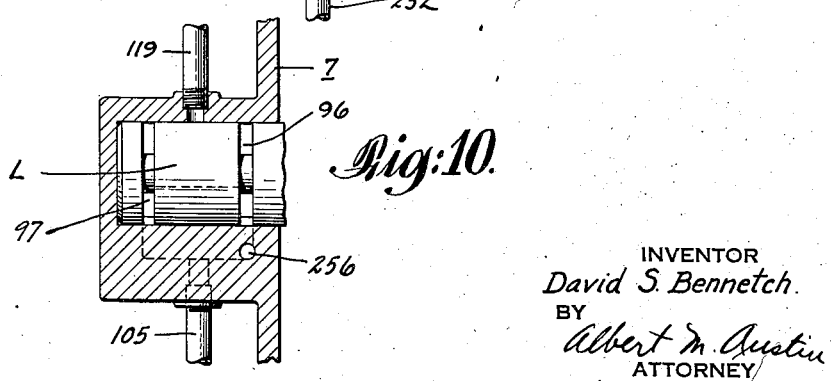

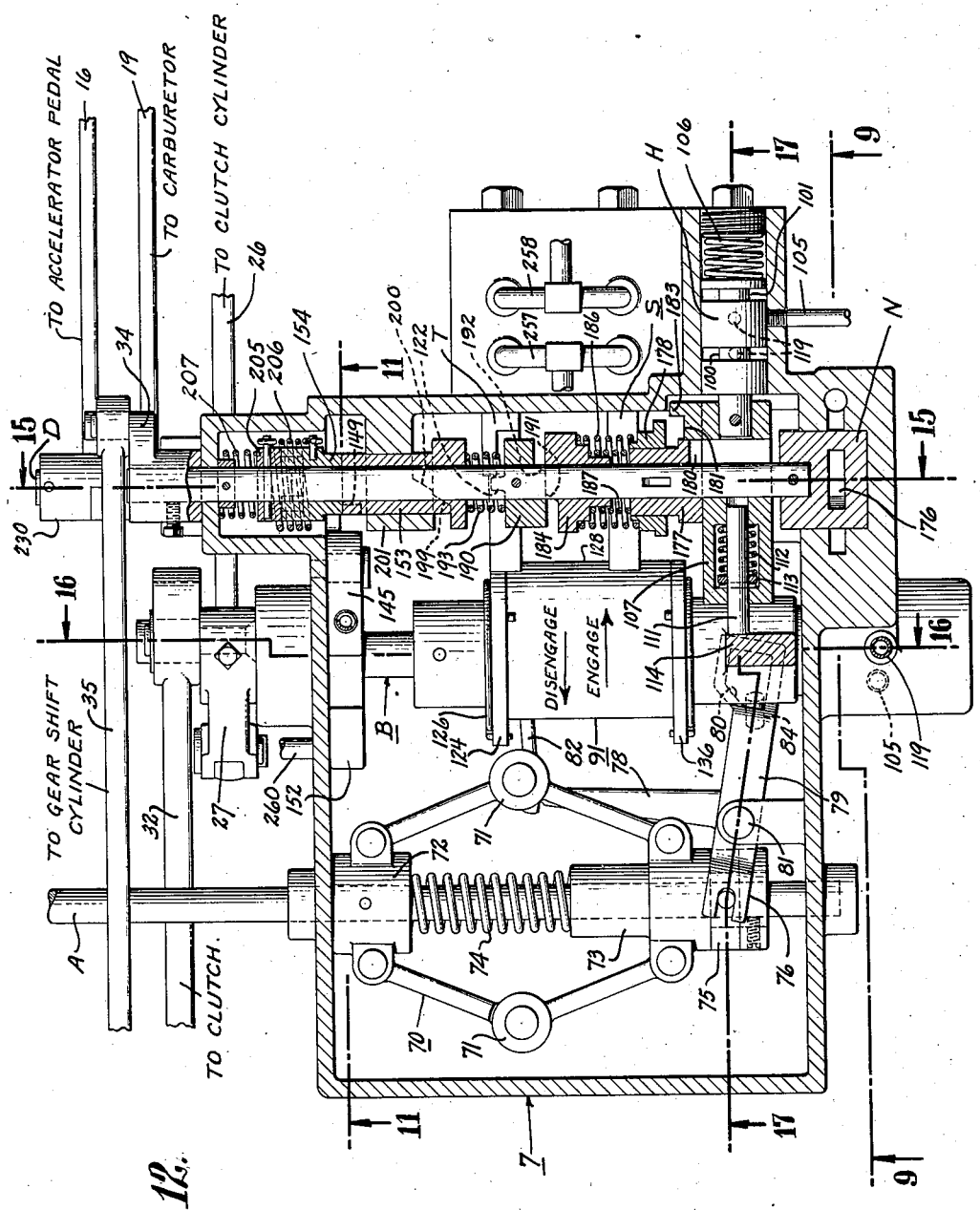

June 16, 1942.         D. S. BENNETCH         2,286,193
FULL AUTOMATIC AUTOMOTIVE TRANSMISSION
Filed July 17, 1937          17 Sheets-Sheet 8

Fig. 13.

INVENTOR
*David S. Bennetch.*
BY
*Albert M. Austin*
ATTORNEY

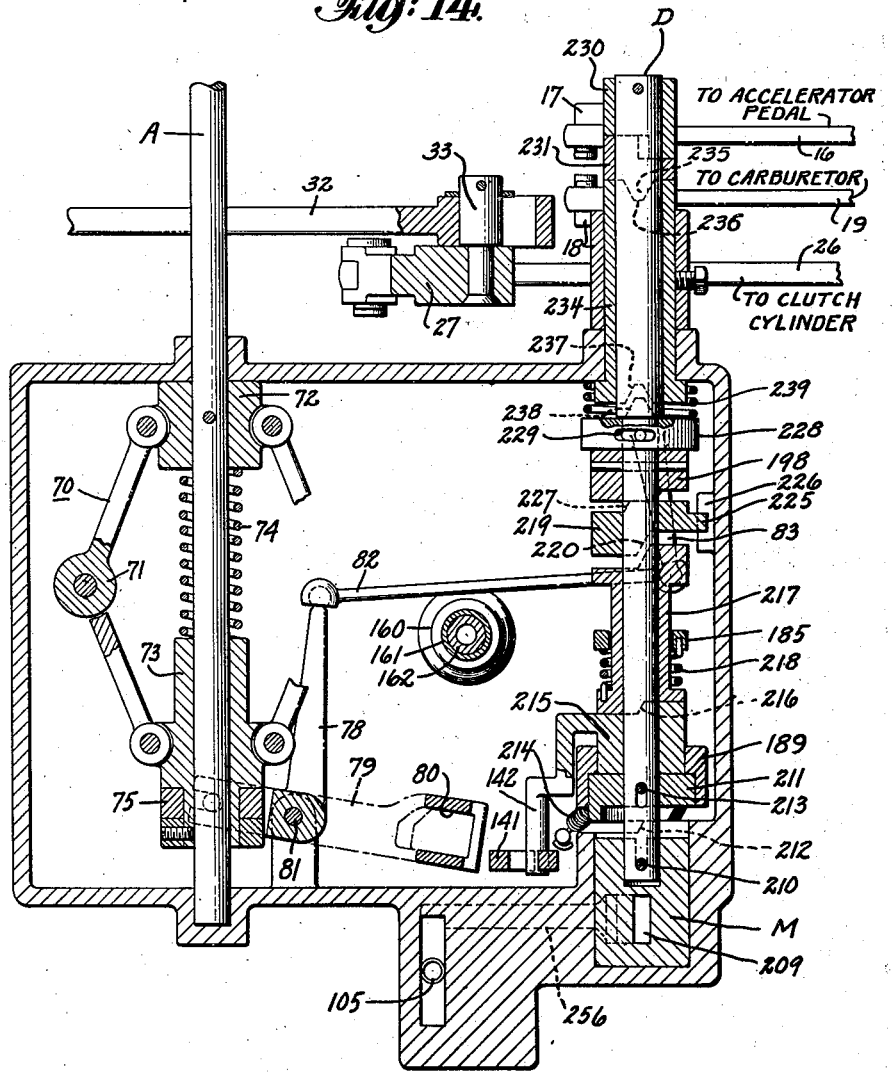

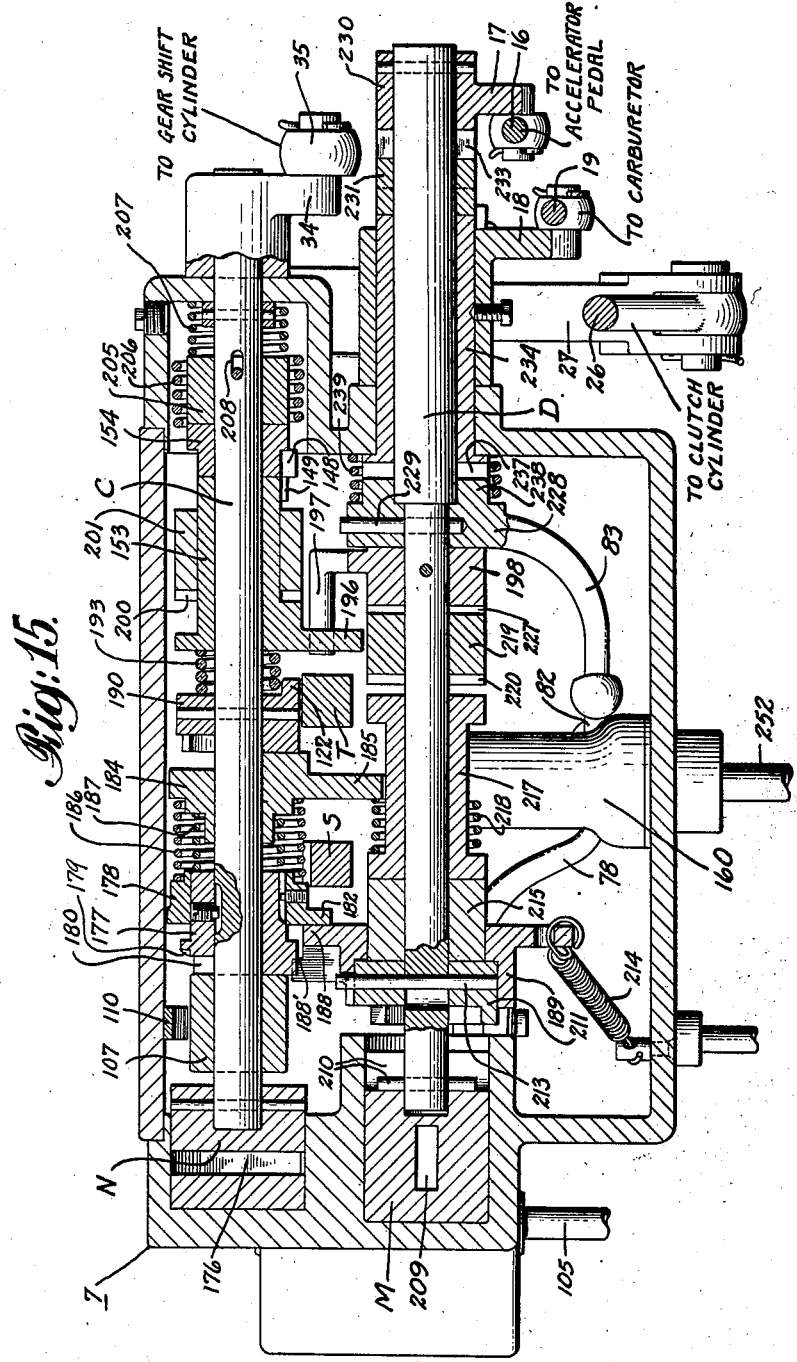

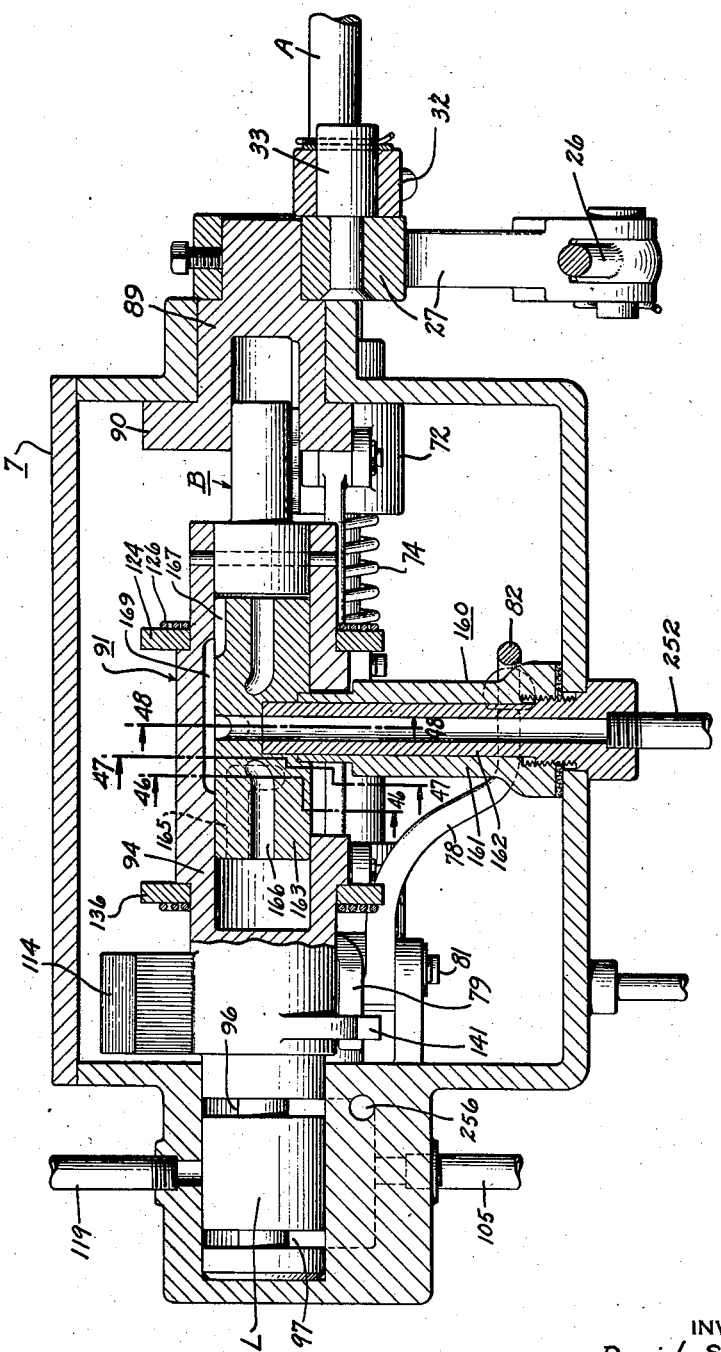

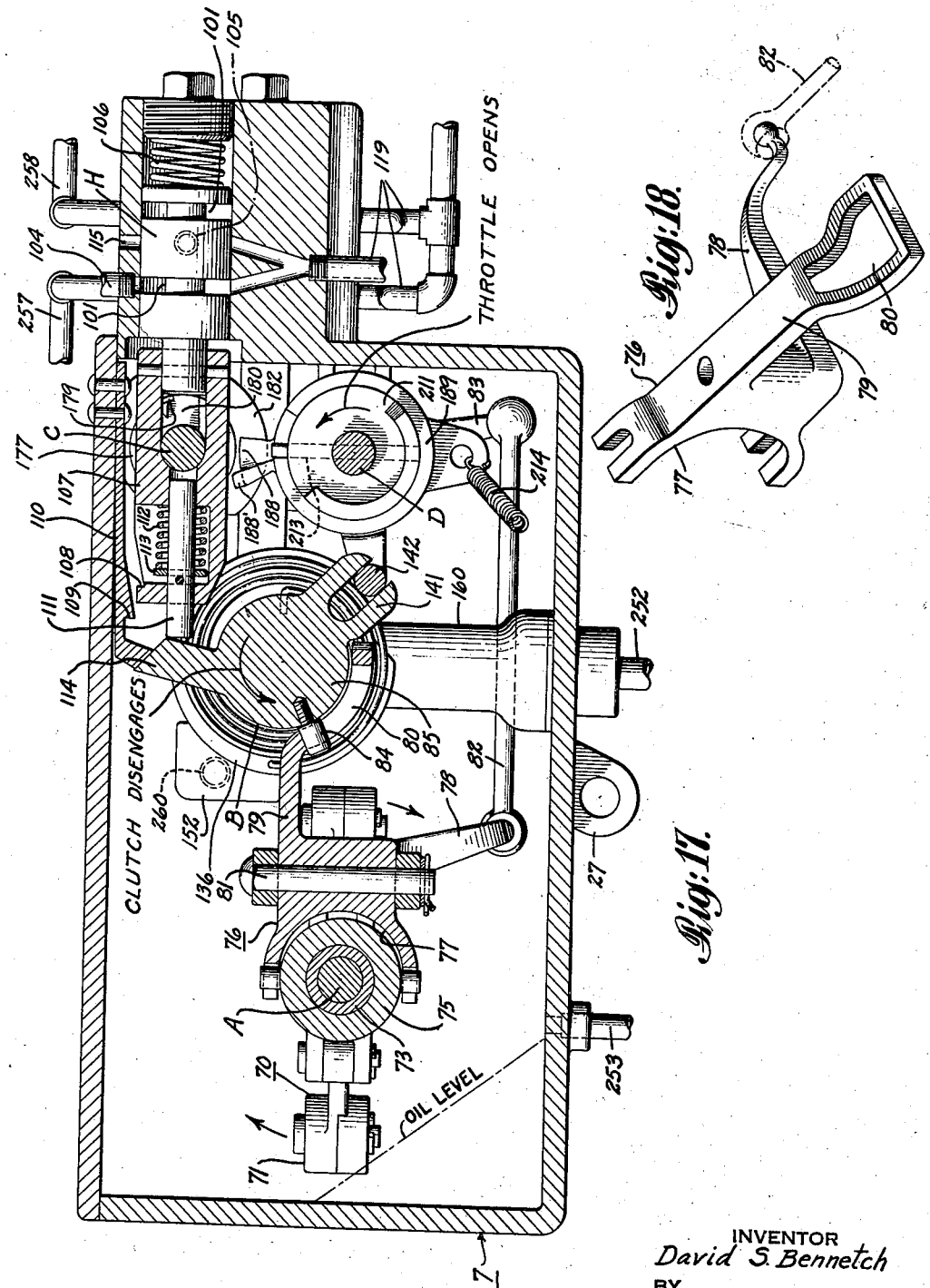

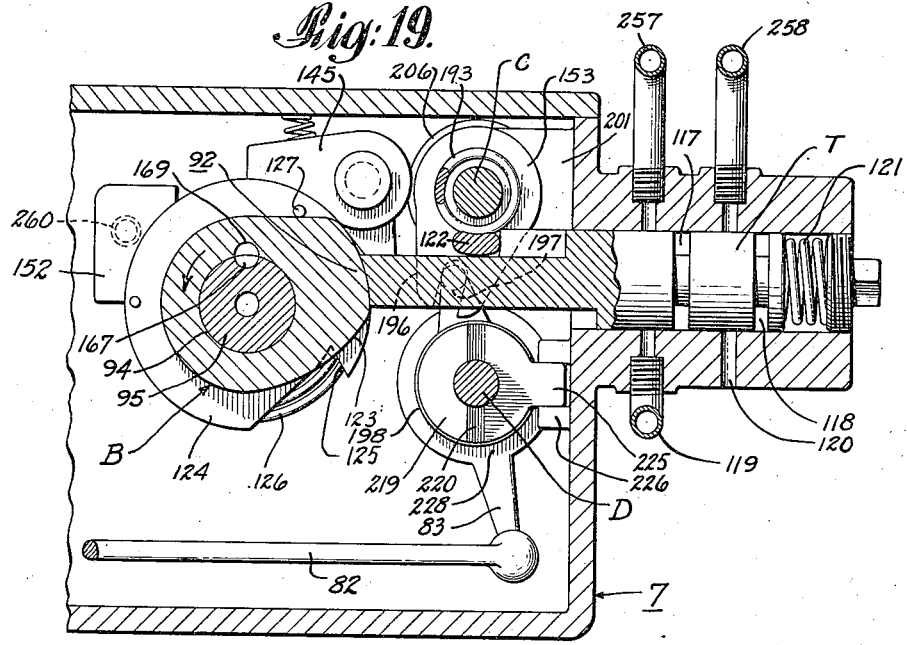
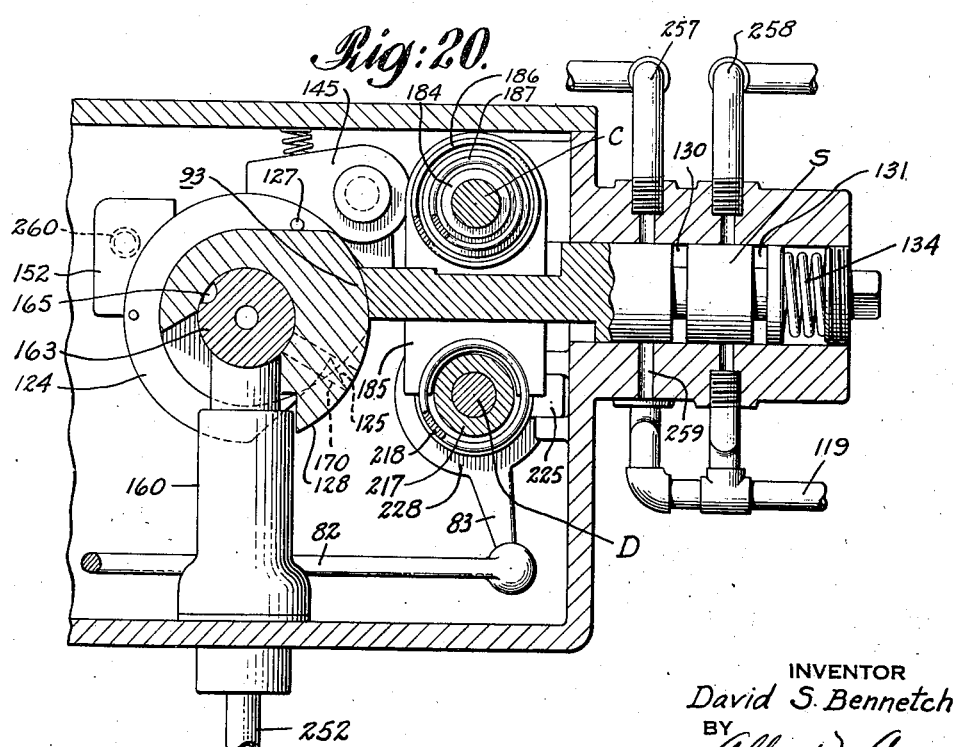

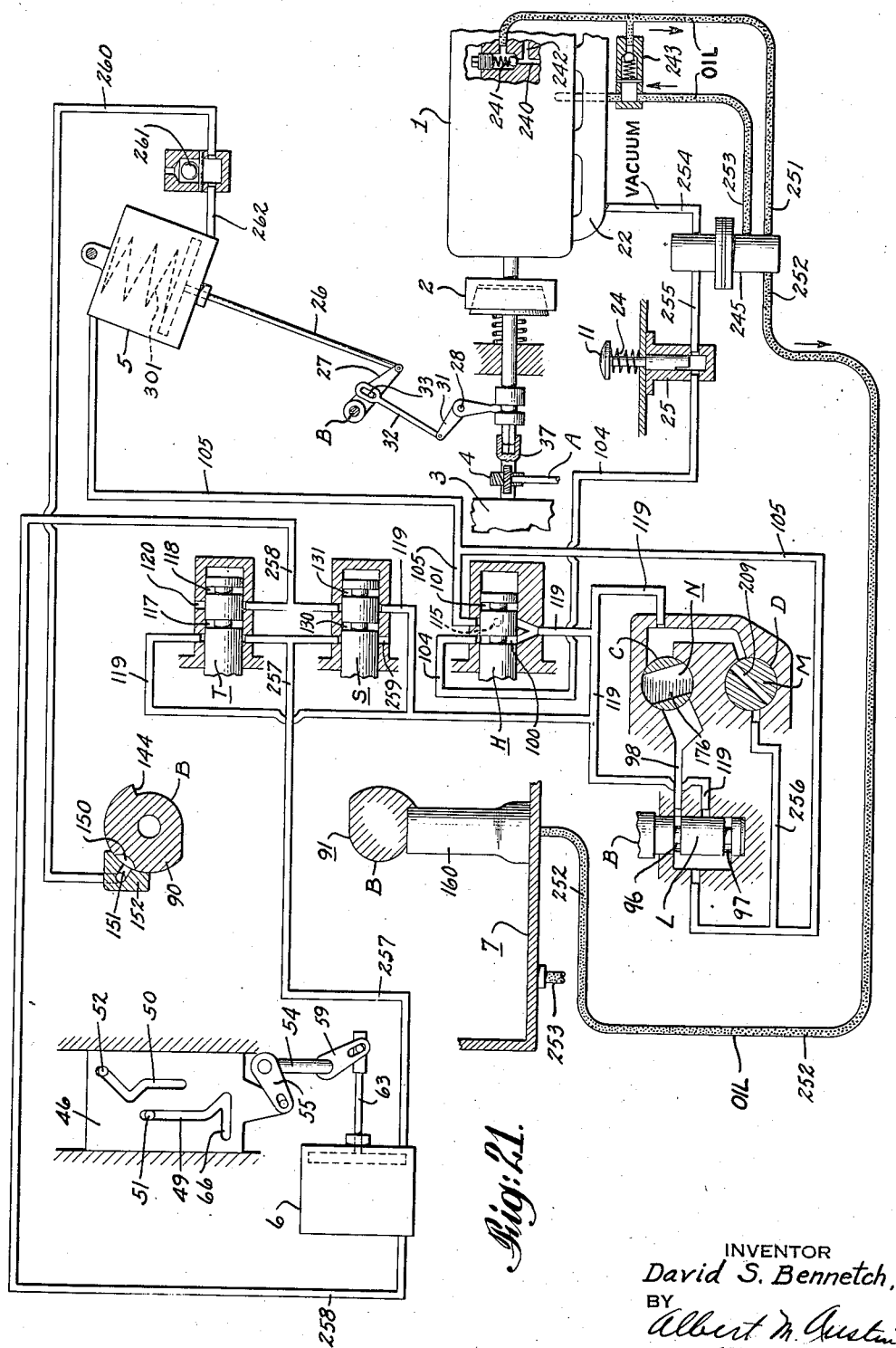

June 16, 1942. D. S. BENNETCH 2,286,193
FULL AUTOMATIC AUTOMOTIVE TRANSMISSION
Filed July 17, 1937 17 Sheets-Sheet 15

INVENTOR
David S. Bennetch.
BY Albert M. Austin
ATTORNEY

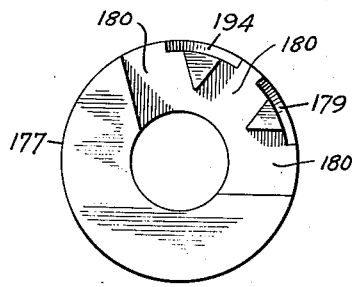
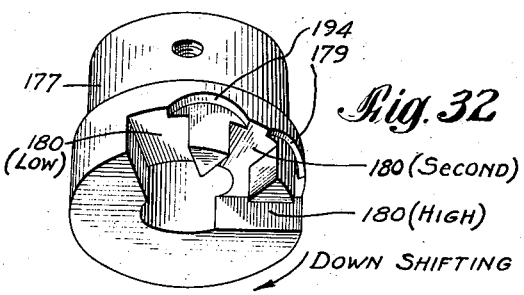
Fig. 31  Fig. 32
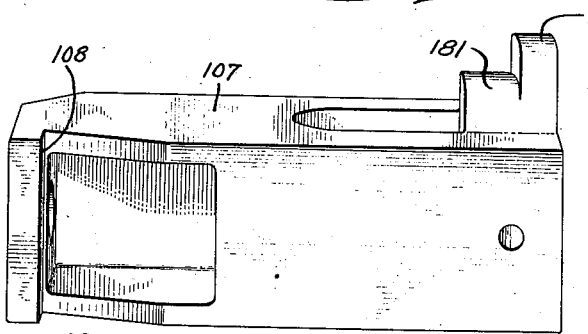
Fig. 33
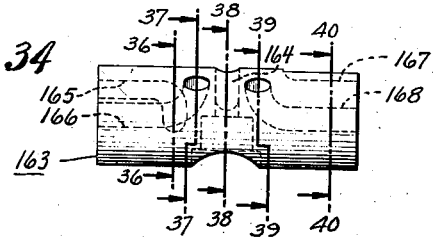
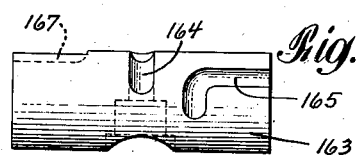
Fig. 34  Fig. 35
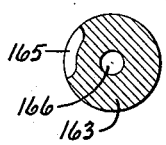 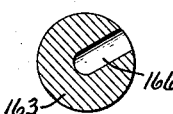 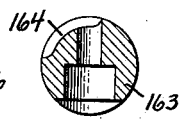 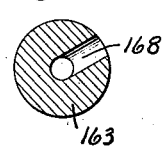 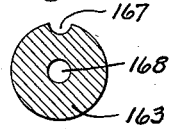
Fig. 36  Fig. 37  Fig. 38  Fig. 39  Fig. 40
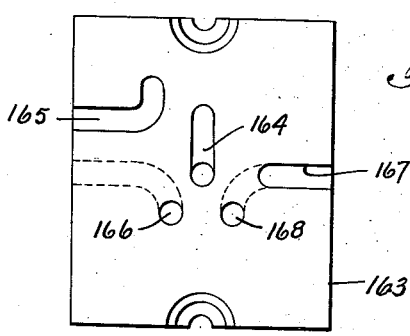
Fig. 41

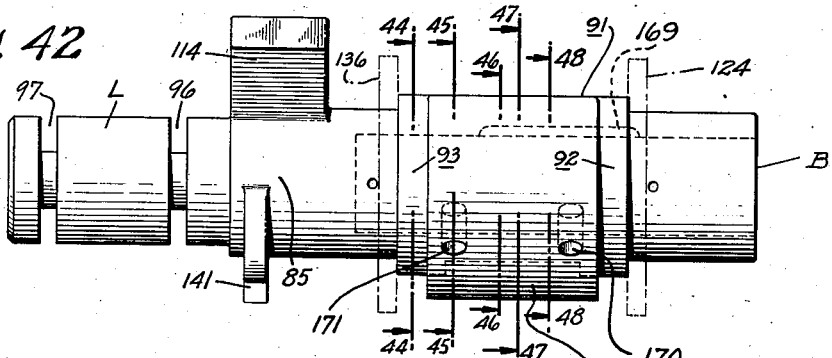
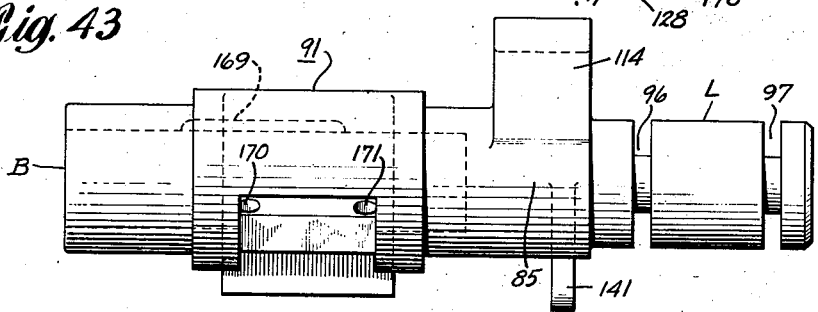
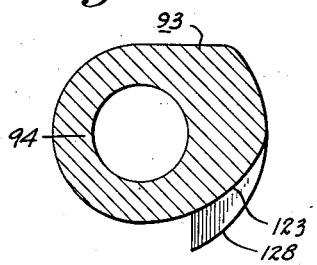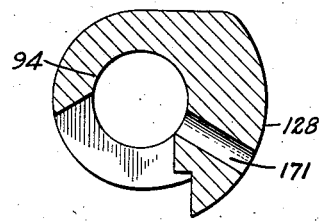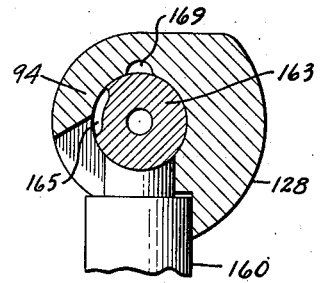
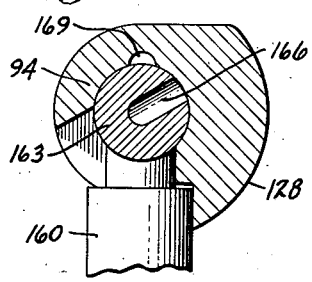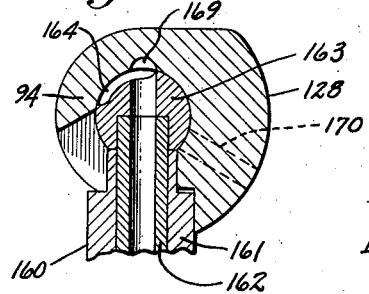

Patented June 16, 1942

2,286,193

UNITED STATES PATENT OFFICE 2,286,193

FULL AUTOMATIC AUTOMOTIVE TRANSMISSION

David S. Bennetch, Sheridan, Pa.

Application July 17, 1937, Serial No. 154,215

20 Claims. (Cl. 192—.01)

The invention relates to speed transmissions for automotive vehicles or the like and, more particularly, to a fully automatic control for gear shift type transmissions.

According to the invention, a transmission of the gear shift type is provided which is fully automatic in that, during normal forward operation of the vehicle, all of the gear shifting and clutch operation takes place without manipulation of any controls whatsoever except to operate the accelerator pedal in accordance with the speed desired.

According to a preferred form of the invention, it is only necessary, before driving the vehicle, to set a knob according to the desired direction, forward or backward. After the knob is actuated for forward speed, all of the other events are entirely automatic, governed by conditions of speed and torque, the operator merely pressing the foot accelerator to a position depending upon the speed at which he desires to drive the vehicle.

Special devices may be provided, according to the invention, to insure smoothness of operation. For example, clutch synchronizing devices may be supplied for insuring that the clutch elements have the same speed before permitting them to engage. Additional devices may be provided for changing, under certain special conditions, the speeds at which the gears shift. For this purpose, according to a preferred form of the invention, a shift delay mechanism may be provided, when quick acceleration is desired, for delaying the speed at which the gears shift from first to second and from second to high until the car has reached a higher speed.

Further improvements may be provided in establishing a manual cut-out device by which the operator may, at any time, render the automatic control inoperative and cause the transmission to remain in whatever condition it happened to be in when the cut-out device was operated. For example, if the automatic transmission has shifted to second and the operator desires to maintain this condition for any special reason, it is only necessary to depress a special "status quo" button which may, if desired, serve also as a foot rest for the accelerator pedal.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a vertical assembly view, partly diagrammatic, of part of an automobile showing the automatic transmission control applied thereto;

Fig. 3 is a longitudinal section through the gear box;

Fig. 5 is a section on the line 5—5 of Fig. 1 illustrating the gear shift cylinder;

Fig. 6 is a side elevation of the control box looking from the left side of the car;

Fig. 7 is a longitudinal section taken through the shift delay valve;

Fig. 8 is a section on the line 8—8 of Fig. 7;

Fig. 9 is a vertical section taken through the end of the control box on the line 9—9 of Fig. 12;

Fig. 10 is a section on the line 10—10 of Fig. 9;

Fig. 11 is a section on the line 11—11 of Fig. 12;

Figure 22:
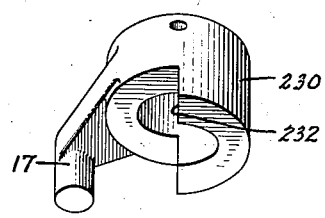
Figure 23:
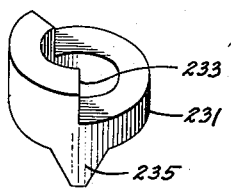
Figure 24:
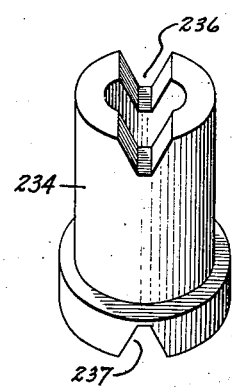

Figs. 12, 13 and 14 are plan sections through the control box taken on the lines 12—12, 13—13 and 14—14, respectively, of Fig. 9;

Figs. 15, 16 and 17 are sections through the control box taken on the lines 15—15, 16—16 and 17—17, respectively, of Fig. 12;

Fig. 18 is a perspective of the governor lever;

Figs. 19 and 20 are sections through the control box taken on the lines 19—19 and 20—20, respectively, of Fig. 13;

Fig. 21 is a diagrammatic layout of the transmission showing the main valves and connecting pipe lines;

Figs. 22, 23 and 24 are perspectives of elements on transverse shaft D;

Figs. 25–30 are perspectives of details on shaft C;

Figs. 31 and 32 are an end view and perspective, respectively, of a further detail on shaft C;

Fig. 33 is a perspective of another element on shaft C;

Fig. 34 is an elevation of the core forming part of the shaft B assembly;

Fig. 35 is an elevation of the same core shown in Fig. 34 taken on the opposite side;

Figs. 36–40 are transverse sections of the core taken on the lines 36—36, 37—37, 38—38, 39—39 and 40—40, respectively, of Fig. 34;

Fig. 41 is a developed view of the core shown in Figs. 34–40;

Fig. 42 is an elevation of the cylinder member of shaft assembly B;

Fig. 43 is an elevation of this cylinder member taken from the opposite side;

Figs. 44–48 are transverse sections taken on the lines 44—44, 45—45, 46—46, 47—47, 48—48 of Fig. 42, certain of these sections being indicated also in Fig. 16.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

General assembly

Referring to the drawings and, more particularly, to Figs. 1, 2, 6 and 21, the automatic transmission is shown for purposes of the invention applied to an automobile. However, it will be understood that the invention may be applied to any automotive vehicle, including trucks, railway locomotives and boats. The engine, which may be of any well known internal combustion type, is denoted by 1; the conventional mechanical clutch by 2 and gear box by 3. For automatically shifting the gears in the gear box 3 and operating the clutch 2, a special control mechanism, indicated by 7, is provided, which mechanism may be conveniently mounted underneath the floor board 12 of the car in proximity to the clutch and gear box. A vacuum clutch cylinder 5 may be mounted on the dashboard 8 for operating the clutch 2 and a vacuum gear shift cylinder 6 may be mounted alongside the gear box for shifting the gears. For driving a governor within the control box 7, a governor drive, including transfer gears 4, is taken off at a point between the clutch gear and gear box 3.

The controls for operating the car comprise a manual control knob 9 projecting from the dashboard 8, an accelerator pedal 10 and a "status quo" button 11. For normal operation after the engine has started, it is only necessary to push in the control button 9 if it is desired to go forward, or to pull it out if it is desired to go backward. Thereafter, it is only necessary to depress the accelerator pedal 10 to control the speed of the car; all gear shifting and clutch operation are done automatically depending upon conditions within the engine or transmission, it being only necessary for the operator to move the accelerator pedal 10 according to the speed he desires to go.

The accelerator pedal 10 (Figs. 1 and 2) is pinned to a shaft 14 journalled in the dash 8. The arm 15 is pinned to accelerator shaft 14 and a link 16 connects arm 15 with an arm 17 mounted on shaft D of the control box 7. Shaft D also supports an arm 18 which is connected by a link 19 to bell crank lever 20 freely journalled on shaft 14. Link 21 connects lever 20 with the throttle (not shown) of the carbureter. Clutching connections (described hereinafter) in the control box 7 are provided for transferring mechanical connection from the carbureter rod 21 to the accelerator pedal 10, or to governing devices within the control box 7. Spring 300 acting between link 21 and a fixed point on the car urges throttle to idling position. Spring 301 under the accelerator pedal 10 urges the pedal upwardly.

It will be understood that for ordinary operation, the carbureter throttle is controlled by the accelerator pedal in the ordinary manner, but during certain periods in the gear shifting cycle, the control of the throttle is taken away from the operator, the throttle being put under the control of automatic devices for driving the engine at the proper speed to synchronize the clutch elements before permitting them to engage.

The status quo button 11 normally acts as a foot rest for the accelerator pedal 10, the spring 24 being strong enough for this purpose. The button 11 is connected to a valve 25 (Fig. 21) for cutting off vacuum from the intake manifold 22 of the car. Thus, at any time, the operator may bear down hard on status quo button 11 to hold all parts of the transmission in any position in which they happen to be at the instant. This will be more fully explained hereinafter.

The control box 7 consists of a casing conveniently secured to the transmission in any desired way, said casing journalling four main shaft assemblies identified as A, B, C and D. Shaft A is a governor shaft and is connected to spiral gears 4 driven from shaft 37 (Figs. 2, 3 and 21), said spiral gears being located between the clutch 2 and gear box 3. Thus, the governor always indicates the speed of the rear clutch element.

Shaft B is called, for convenience, the clutch shaft. This shaft is operated by clutch vacuum cylinder 5 pivoted to a bracket on the dash 8. Piston rod 26 (Figs. 1 and 2) is connected with arm 27 mounted on clutch shaft B. The shaft, by means of which the clutch 2 is mechanically engaged and disengaged, is indicated by 28 and it has connected thereto an arm 31 which is connected by link 32 to arm 27, a pin and slot connection 33 being provided between link 32 and arm 27. This insures operation of shaft B before disengagement of clutch 2 for a purpose which will hereinafter appear.

Shaft C is called, for convenience, the gear shift shaft and has mounted thereon an arm 34 (Figs. 1 and 2) to which is connected a link 35 extending to mechanism on gear box 3, as will hereinafter be described more in detail.

Shaft D is called, for convenience, the transfer shaft since its duty is to transfer the control of the throttle from the accelerator pedal to the governor and vice versa, as explained above.

Gear box and controls

Referring now more particularly to Figs. 1, 3, 4 and 5, the gear box 3 comprises a gear shift assembly of the conventional type to which automatic gear shift mechanism has been applied. It will be understood that the gear box may be of the old fashioned type in which the gears actually shift, or of the more modern type where the gears remain in engagement, with suitable clutches being shifted inside to obtain the proper speed ratio. In the specification and in the claims, the expression "gear shift" or equivalent expressions are intended to apply to either type of transmission, or transmissions made up of both types, as in the form shown in the drawings.

The drive shaft 37 extends from the rear clutch element of clutch 2 and driven shaft 38 extends to the propeller shaft or rear end of the vehicle driving mechanism. The transmission shown for purposes of illustration comprises a sliding gear 39 selectively engageable with either the reverse gear 47 or the low speed gear 48, and a sliding dog 40 having slidable synchromesh engagement with either the high speed gear 67 or the second speed gear 68, as will be understood by those skilled in the art. It will be understood that, if desired, the sliding gear 39 may be replaced with a sliding dog similar to dog 40.

The sliding gear 39 and sliding dog 40 are controlled by suitable forks 41 and 42 secured to bars or rails 43, 44 having the usual detents 45 for holding the slidable elements in proper position. In place of the usual gear shift lever for shifting the rails 43, 44 a special cam plate 46 (Figs. 3 and 4) is provided.

Cam plate 46 has a pair of cam slots 49 and 50 in which ride followers 51 and 52 secured to the rails 43, 44, respectively. It will thus be seen that the slots 49 and 50 are so shaped that upon lateral movement of cam plate 46 the gears may be shifted from the high position indicated in Fig. 4 through second to low. The shifting to reverse is not automatic, but is manual, as will be described hereinafter.

Attention is called to offsets 53 provided in slot 50. These offsets are for the purpose of providing increased resistance in the path of movement of follower 52 to prevent clashing of the gears during shifting to second or high speeds. These points of increased resistance require more vacuum to be built up in the gear shift cylinder 6, thus giving a slight delay just before the gears engage, and thus providing opportunity for the gear synchronizing elements to operate.

For shifting the gears to reverse, it is necessary to operate hand knob 9. This knob is connected by a flexible sleeve and wire 64 (Figs. 1 and 4) fastened to lever 65 mounted on a bracket and connected to rail 43. Thus, when the cam plate 46 is moved to the uppermost position from the position shown in Fig. 4, the rail 43 can be moved by hand. Automatic movement of the cam plate 46 to its uppermost position from the position shown in Fig. 4, puts the transmission 3 in low and the follower 51 in line with the straight part 66 of the cam slot. Thus, pulling out the knob 9 permits the follower 51 to move the length of cam slot 66, placing the transmission manually in reverse.

For operating the cam plate 46 automatically, a vertical shaft 54 (Figs. 2, 4 and 5) is provided. Shaft 54 has an arm 55 having pin and slot connection 56 with cam plate 46. The lower end of shaft 54 is journalled in a bracket 57 (Fig. 2) and carries arm 59 having a pin 60 working in a slot 61 in arm 59 and in a slot 62 in bracket 57 (Fig. 5). The pin 60 passes through the end of piston rod 63 of gear shift cylinder 6. Thus, the piston rod 63 is constrained to move in a straight line and operate cam plate 46. The piston rod 63 carries a pin 58 for engagement with link 35 extending to arm 34 on shaft C of the control box.

Governor shaft assembly A

Referring now to Figs. 12, 13, 14, 17 and 18, the governor is indicated, in general, by 70 and is of the ordinary flyball type. It comprises balls 71 supported by links pivoted, respectively, to an axially fixed collar 72 and an axially slidable sleeve 73. Spring 74 operates to keep sleeves 72 and 73 apart against the centrifugal force exerted by the flyballs 71. A collar 75 is journalled on sleeve 73 connected to a governor lever 76.

Referring now to Fig. 18, governor lever 76 comprises a forked portion 77 engaging studs on collar 75, a throttle arm 78 and a synchronizing arm 79. Arm 79 has a slot 80 with a wide end and a narrow end. The lever 76 is pivoted to the frame at 81. Arm 78 has a link 82 extending to arm 83 on collar 228 on transfer shaft D. Slot 80 coacts with pin 84 on drum 85 of shaft B (Fig. 17).

Clutch shaft B

The clutch shaft B is operated by the clutch vacuum cylinder 5 and has two rotary positions corresponding to engagement and disengagement of the clutch 2. Referring principally to Figs. 12, 13 and 16, the clutch shaft comprises an axially fixed hub 89 and an axially slidable drum 91, this drum being shiftable axially by operation of the governor and by variation in oil pressure controlled by vacuum of intake manifold, as will be explained more fully hereinafter.

The hub 89 has a flange 90 (Figs. 11 and 16). The axially shiftable drum 91 comprises a valve L, releasing devices 92 and 93 (Figs. 19 and 20) for operating up-shift valve T and down-shift valve S, respectively, an oil cylinder 94 carrying a plug 95, featherkeyed to hub 89. The valve L (Fig. 21) has grooves 96 and 97 registerable with ports communicating with pipes 98 and 119.

The rotation of clutch shaft B operates kick-off valve H. Referring especially to Figs. 12, 17 and 21, the valve H contains grooves 100 and 101 registering with atmosphere port 115 and with ports communicating with pipe 119 and with pipes 104 and 105. Valve H is pressed inwardly by spring 106 held in position by a screw threaded plug. Valve H is pinned to control block 107 (Fig. 33) which straddles shaft C. Control block 107 has a catch 108 cooperating with a projection 109 on spring catch 110, the latter being engaged by an arm 114 on shaft B. The control block 107 carries a slidable plunger 111, which in turn carries a washer 113 held in place by a pin passing through the plunger. A spring 112 acts between the body of block 107 and the washer 113 tending to hold the plunger 111 away from the body of the control block. The catch 108 limits the outward movement of the plunger 111. The plunger 111 is engageable with the arm 114. The operation of valve H is also controlled by certain devices on shaft C and will be described hereinafter.

The clutch shaft B also operates up-shift valve T (Figs. 19 and 21). Valve T contains grooves 117 and 118 which cooperate with ports connecting with pipes 119, 257 and 258 and with atmosphere port 120. Spring 121, held in place by a screw threaded plug, urges valve T inwardly, which inward movement is controlled by a stop 122 on pinned collar 190 on shaft C and by cam assembly 92.

Cam assembly 92 comprises a cam surface 123 on the cylinder 94 and a washer 124 journalled on cylinder 94 and connected thereto by a torsion spring 126 which tends to keep pin 127 engaged against cylinder 94. The washer 124 has a notch 125 into which the end of valve T drops when shaft B rotates in the direction of the arrow to the proper position, provided, of course, stop 122 has moved. Valve T is reset by rotation of shaft B in the opposite direction, causing valve T to ride up cam surface 123, the torsion spring 126 permitting valve T to carry washer 124 with it. When the top of cam surface 123 is reached, the notch 125 disengages valve T, permitting the torsion spring 126 to move washer 124 back to the position shown in Fig. 19.

Rotation of shaft B also operates up-shift valve S (Figs. 20 and 21). Valve S has grooves 130 and 131 registering with ports connecting pipes 257, 258 and 119, and with atmosphere port 259. Spring 134, held in place by a screw plug, tends to push valve S inwardly. Valve S is controlled by cam assembly 93 having washer 136 and is similar in construction to valve assembly 92. The operation of valve assembly 93 and its resetting is similar to that of valve assembly 92 and it is not necessary to repeat the explanation.

Located between the cam surface 123 of assembly 92 and the corresponding cam surface of assembly 93 is a cylindrical surface 128 (Figs. 42–48) acting to prevent operation of valves S and T upon rotation of drum 92 unless the latter is in proper axial position.

The drum 91 on shaft B also carries a fork 141 (Fig. 17) engaging an arm 142 on collar 215 on transfer shaft D for causing the transfer of throttle control between accelerator pedal and governor.

Figure 26:
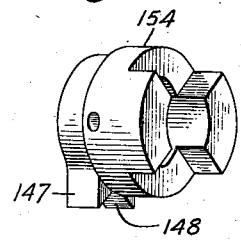

The hub 89 on clutch shaft B (Figs. 11 and 16) carries a flange 90 which has a notch 144 engageable by spring pressed detent 145 having a finger 146 engageable by double teeth 147 and 148 on collar 154 on shaft C (Fig. 26). Finger 146 is also engageable by a single finger 149 on collar 153 (Fig. 27) on shaft C. This mechanism is for the purpose of holding the clutch disengaged until the proper time for releasing.

Flange 90 also has a port 150 registerable with a port 151 on member 152 secured to the casing for the purpose of relieving pressure under the piston of clutch cylinder 5, as will be explained more in detail hereinafter.

The shaft B also comprises an oil cylinder 94 (Figs. 16 and 34–48) in which rides a core 163 supported by a stationary post 160. Post 160 is made up of sleeves 161 and 162 secured together and held by the wall of the casing. An oil passage passes through the post 160 communicating with oil supply pipe 252.

Oil pressure transmitted by post 160 to the interior of cylinder 94 operates to exert an axial force on cylinder 94, the direction and amount of which depends upon the rotary and axial position of cylinder 94. For controlling this force, the core 163 is provided with a series of passages, indicated by 164—168 (see Fig. 41). The cylinder 94 is provided with an axial groove 169 and radial holes 170 and 171 (see Figs. 42 and 43).

*Gear shift shaft C*

This shaft is operated by the gear shift cylinder 6 and has three positions of rotation corresponding to "low," "second" and "high." It has no axial movement. Shaft C supports valve N (Figs. 9 and 21), this valve having a single passage 176 communicating with passages within the valve casing. Valve N is closed only for high gear, being open for second and low gears.

Figure 30:
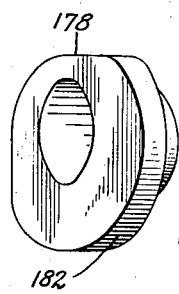
Figure 29:
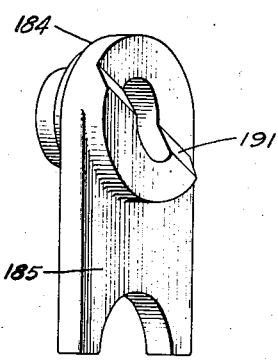

The kick-off valve H (Fig. 17) is also controlled by shaft C in addition to the control by shaft B. Shaft C carries a three position collar 177 (Figs. 15 and 32) which is featherkeyed to the shaft, permitting longitudinal movement on the shaft, but no rotative movement with respect to the shaft. Mounted on the collar 177 is an outer collar 178 (Fig. 30). Both collars 177 and 178 engage with valve block 107 (Fig. 33) to control the position of kick-off valve H. The three position collar 177 is operated automatically, but the outer collar 178 is operated manually.

The three position collar 177 (Figs. 31 and 32) comprises a series of slots 180 corresponding to first, second and high gears and also has a series of notches 179 and 194 connecting the slots 180. Notches 179, 194 and slots 180 cooperate with nose 181 on valve bar 107.

Manual collar 178 (Fig. 30) has a flange 182 which cooperates with nose 183 on valve bar 107. Flange 182 is moved axially by finger 188 on collar 189 on shaft D. Manual collar 178 is featherkeyed to three-position collar 177 so as to rotate therewith, but to have independent axial movement. The flange 182 on manual collar 178 is flattened at two places, as shown in Fig. 30, to permit approximately ninety degree rotation of both collars 178 and 177. The flat parts on flange 182 engage the casing wall to limit the rotation of these collars to the said approximately ninety degrees.

It will be understood, especially from Fig. 12, that both three-position collar 177 and manual collar 178 must be in the proper position to release valve H. Manual collar 178 must be moved axially out of the way and three-position collar 177 must be moved to permit the nose 181 on valve bar 107 to engage in one of the slots 180 on three-position collar 177, as will be explained hereinafter.

Figure 28:
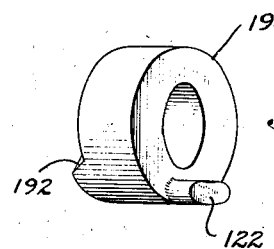

Gear shift shaft C also carries collar 184 (Fig. 29), this collar carrying the tail 185 partially surrounding sleeve 217 on shaft D. Springs 186 and 187 operate between collar 184 and collars 178 and 177, respectively. Collar 184 has a cam surface 191 cooperating with a cam surface 192 on collar 190 pinned on shaft C. Cam surfaces 191 and 192 permit collar 184 to approach pinned collar 190 for low gear only. Pinned collar 190 also carries stop 122 cooperating with the up-shift valve T (Fig. 19), above referred to. Stop 122 prevents release of up-shift valve T when the gears are in high only, it being moved out of the path of the valve stem for second and low speeds. A perspective of pinned collar 190 is shown in Fig. 28.

Figure 27:
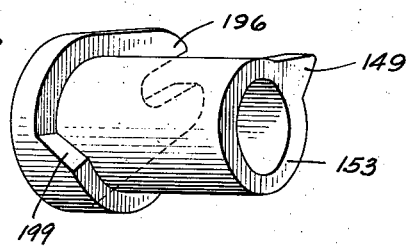

Shaft C also carries sleeve 153, attention being called to Fig. 27 showing a perspective. Sleeve 153 has a fork 196 cooperating with arm 197 on collar 198 pinned to shaft D. Sleeve 153 has a cam face 199 cooperating with a cam face 200 on an extension 201 of the casing (Fig. 12). Sleeve 153 supports the single finger 149 for tripping the detent 145 shown in Fig. 11, as explained above. Spring 193 urges sleeve 153 away from pinned collar 190. Cam surfaces 199 and 200 permit single finger 149 to move to the axial position now occupied by double fingers 147, 148 only when the accelerator pedal 10 is in free position.

Figure 25:
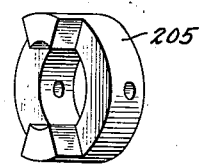

Shaft C supports a pair of lost motion collars 154 and 205, shown in perspective in Figs. 26 and 25, respectively. Collar 154 carries a pair of teeth 147 and 148 cooperating with the detent 145 in Fig. 11, as explained above. Collar 154 further comprises a pair of dog teeth kept centered between corresponding dog teeth on collar 205 by a torsion spring 206 acting between these collars. A compression spring 207 acting against the casing urges both collars 154 and 205 to the left in Fig. 15, the slot 208 in shaft C carrying a pin secured to collar 205 permitting the collars to move back and forth axially.

Transfer shaft D

The transfer shaft D is for the purpose of transferring the throttle control back and forth between the accelerator pedal and the governor. Shaft D (Figs. 13, 14 and 15) controls valve M. As shown in Fig. 21 valve M comprises a single port 209 registerable with a passage in the valve casing and with a port communicating with pipe 256. The valve M has a pin and slot connection 210 with the shaft D, whereby the latter may have limited axial movement.

Supported upon shaft D are collars 211 and 189. Collar 211 has a pin 213 passing through a slot in shaft D. Collar 189 has a slot giving a lost motion connection with pin 213 (see Figs. 13 and 17), both axial and rotary.

Collar 211 has a cam face cooperating with a cam face 212 on a boss on the casing. Spring 214 tends to hold collar 211 against cam face 212 and also tends to rotate collar 189 in a clockwise direction as viewed in Fig. 17. Collar 189 supports the finger 188 for moving the manual collar 178 on shaft C. Finger 188 has an extension 188' for moving three-position collar 177 on shaft C. Collar 215 supporting arm 142 is also supported on shaft D. This collar has a cam surface 216 cooperating with sleeve 217 also supported on shaft D.

Spring 218 acts between a flange on sleeve 217 and tail 185. Spring 218 is pinned to both sleeve 217 and tail 185, as shown in Fig. 14. Spring 218 thus exerts axial tension and rotative tension between these parts. The axial tension helps hold collar 211 against boss cam 212. The rotative tension insures the return of sleeve 217 to proper rotative position after rotation, as explained hereinafter.

Floating collar 219 has cam engagement 220 with sleeve 217 and cam engagement 227 with pinned collar 198. Floating collar 219 is kept from rotating by a finger 225 sliding between guides 226 (Figs. 14 and 19). The pinned collar 198 carries arm 197. The steps in the cams of collar 211 and pinned collar 198 correspond so that upon rotation of shaft D both cams ride off their high parts together.

Also mounted on shaft D is a collar 228 carrying arm 83 and having a pin and slot engagement 229 with the shaft D, whereby collar 228 and shaft D are free to rotate independently, but are constrained to move together axially.

The transfer clutches for changing over throttle control between arm 83 operated by the governor 70 and link 16 leading to the accelerator pedal are made up as follows: Collar 230 (Fig. 22) is pinned to shaft D and supports arm 17; collar 230 has shoulders 232 abutting shoulders 233 on collar 231 loosely supported on shaft D. Shoulders 232 and 233 permit a lost motion connection between the accelerator pedal and the throttle to permit movement of the shaft assembly D by the accelerator pedal 10 prior to opening of the throttle.

The transfer clutch assembly also comprises a sleeve 234 to which the arm 18 leading to the throttle is rigidly secured. Sleeve 234 shown in perspective in Fig. 24 has a V-slot 236 engageable with a projection 235 on collar 231. Sleeve 234 also has a V-shaped slot 237 engageable with a projection 238 on collar 228. Spring 239 tends to hold the clutch 237, 238 disengaged and to hold shaft D to the left in Fig. 15.

It will be seen, particularly from Figs. 13, 14 and 15, that in the position shown, the throttle rod 19 is being controlled by the accelerator pedal rod 16 through lost motion connection 232, 233 and clutch 235, 236 while the governor arm 83 is disconnected from sleeve 234 by clutch 237, 238. Upon operation of any of the above described devices axially moving shaft D against spring 239, it will be obvious that clutch 237, 238 will engage and clutch 235, 236 will disengage, taking the throttle control away from the accelerator pedal and giving it to the governor.

Shift delay valve

Referring to Figs. 7, 8 and 21, the shift delay valve 245 comprises a casing having a plunger 246 slidable therein and carrying a flexible diaphragm 247. Spring 248 normally tends to hold the valve member 249 against the seat 250. Valve member 249 has slots or flutes 244 for permitting leakage when valve member 249 is raised off its seat 250.

Referring now to Fig. 21, the passage below the valve seat 250 is connected by pipe 251 to a source of oil pressure 240 in the engine 1. This oil pressure may be developed from any desirable source, as for example, a regular lubricating pump. A pressure relief valve 241 usually present in the ordinary engine acts to limit the oil pressure. If desired, a second relief valve 243 may be provided to insure relief for the overflow oil passing through valve 241. Pressure relief valve 243 may operate on a pressure somewhat less than relief valve 241.

Pipe 252 leads to the oil on oil post 160 in Fig. 16. The passage above the flexible diaphragm 247 connects by pipe 254 with the intake manifold of the internal combustion engine 1 constituting a source of vacuum. The chamber above diaphragm 247 also connects by pipe 255 to status quo valve 25. The chamber above the valve seat connects with the oil sump of the engine 1 through pipe 253 so that oil led to the regular engine bearings through passage 242 has more uniform pressure, irrespective of engine speed. In the ordinary car engine there is usually an excess of oil passing through the pressure valve 241 which oil is used, according to the invention, to operate oil cylinder 94 in Fig. 16.

The operation of shift delay valve 245 is as follows: When vacuum in the intake manifold 22 of engine 1 is high, as for example, when traveling along on a level at a moderate rate of speed, plunger 246 is in an elevated position and the valve member 249 is raised well off its seat, permitting the oil under pressure in pipe 251 to be led through pipe 253 back into the crank case of the engine. Thus, the pressure in pipe 252 conveyed to the oil post 160 is insufficient to have any great regulating action on the axial position of the oil cylinder 94 on shaft B. However, if the vacuum in pipe 254 drops as in accelerating or going up a steep grade, the valve member 249 closes down toward seat 250, closing this valve either partially or totally. The oil pressure in 251 now builds up in post 160 exerting the desired action on oil cylinder 94.

Pipe diagram

The various parts of the system conveying either oil or vacuum are illustrated diagrammatically with connecting pipe lines to assist in understanding the invention. The pipe lines conveying oil are darkened, whereas those conveying air are unshaded.

The status quo valve 25 is connected to kick-off valve by pipe 104; kick-off valve H is connected by pipe 105 to clutch cylinder 5 and to valve L; valve H is connected by pipe 119 to valves N, M and L and to valves S and T; valve M and valve L are connected by pipe 256; valve L and valve N are connected by pipe 98; valves T and S are connected by pipe 257, 258 to gear shift cylinder 6. Oil pipe 253 also connects with control casing 7 to lead the oil back to the engine sump.

Pipe 262 connects clutch cylinder 5 with check valve 261 and pipe 260 connects check valve 261 with casing member 152. When vacuum is applied to the upper end of clutch cylinder 5 to disengage car clutch 2, air is drawn in under its piston through pipe 262 and check valve 261. When air is applied to the upper end of clutch cylinder 5 to engage the car clutch 2, the air under the piston is permitted to leak out slowly through pipe 260 through a loose fit between casing member 152 and flange 90, thus causing clutch cylinder 5 to act as a dash pot to ease the engagement of car clutch 2. After car clutch 2 is engaged, the air under the piston of clutch cylinder 5 is completely released by continued rotation of shaft B bringing atmosphere port 150 in flange 90 opposite port 151 in casing member 152.

Thus, it will be seen from the above that the kick-off valve H acts as a master control for the vacuum leading to both the clutch cylinder 5 and the gear shift cylinder 6. There are two paths leading from the kick-off valve H to the gear shift cylinder 6, (1) through the upshift valve T to one end of the gear shift cylinder 6, and (2) through the downshift valve S to the other end of the gear shift cylinder 6.

Disengagement of the car clutch for shifting releases the upshift valve T or downshift valve S depending on whether upshifting or downshifting is in order. Thus, for upshifting, it is necessary for the kick-off valve H to be in cocked position and the upshift valve T to release. For downshifting, it is necessary for the kick-off valve to be in cocked position and the downshift valve S to release. Shifting of the gears releases kick-off valve H. This removes vacuum from the gear shift cylinder 6 and supplies atmosphere to the clutch cylinder 5. Engagement of the car clutch cocks the kick-off valve H and upshift or downshift valve, whichever has operated.

It will be noted that when either the upshift valve T or the downshift valve S releases to operate the gear shift cylinder 6, this valve also arranges for the admission of atmosphere to the opposite side of the piston from the vacuum.

It will also be seen from the above that the kick-off valve H acts as a master control between the source of vacuum and the clutch cylinder 5. Between the kick-off valve H and the clutch cylinder 5 there are three paths, namely, (1) the path comprising pipe 119 and valve L (this path is open only when valve L is in upper position in Fig. 21); (2) the path consisting of valve M only (this valve is open only when the accelerator pedal is in its uppermost free position); and (3) the path consisting of valve N, pipe 98 and valve L in series (valve N is closed only in high gear and this path through valve L is open only when valve L is in its lower position).

It should be noted here that valve L has three effective positions, (1) an upper position in which port 96 communicates with pipe 98, (2) a lower position in which port 97 communicates with pipe 119, and (3) an intermediate position in which neither pipe 98 nor 119 is open through valve L. The significance of these three positions will be explained:

On the down shift, slowing down of the car moves valve L to its upper position. When the gear shifts to the lower speed; the valve L moves downwardly to its intermediate position due to increase in governor speed, but valve L does not reach its lower position because the car is not traveling fast enough at this time. Conversely, on the upshift, speeding up of the car moves valve L to its lower position. The shifting of the gears into the next higher speed slows down the governor which shifts valve L upwardly to its intermediate position, but valve L does not reach its upper position because the car is traveling too fast at this time. Thus, immediately after a shift is completed the valve L is in intermediate position.

Valve N is to be closed for high gear only since, after the car is in high, valve L may reach its lower position and the valve N being closed serves to keep vacuum cut off even though valve N is open through pipe 98.

Valve M is open only when the accelerator pedal is in free position because here it is desired to operate the clutch cylinder 5 irrespective of car speed.

Oil cylinder operation

There are four different relative positions which the cylinder 94 and core 163 may assume, depending upon the rotary position of the cylinder and upon its axial position. The rotary position depends upon engagement or disengagement of the car clutch. The axial position depends upon the speed of the governor. The four relative positions are as follows:

(1) Clutch engaged, cylinder in lower position in Fig. 13.

When the speed of the governor is sufficiently high, the cylinder 94 assumes the lower position in Fig. 13. In this case the oil pressure tends to force the cylinder 94 upwardly, the oil being fed through post 160, through ports 169 and 167 to the upper end of the cylinder, the lower end of the cylinder exhausting through port 165 into the control box. The action of the oil here is for the purpose of delaying the downward movement of the cylinder 94 on the up-shift when the car is accelerating quickly. This raises the car speed at which the gear up-shifting takes place to give better "get-away," as will be more apparent as the description proceeds.

(2) Clutch engaged, cylinder in upper position.

This is the position assumed by the cylinder when the car speed is not sufficiently high. In this situation, the oil pressure tends to force the cylinder upwardly in Fig. 13. In this case, oil pressure is fed to the upper end of the cylinder through port 169, the lower end of the cylinder exhausting through port 165. The oil pressure in this instance acts to hasten the down-shift when the car is traveling under heavy load, as for example, when the car encounters a steep grade, in which case it is desired that the downshifting of the gears occur at a higher car speed than under ordinary deceleration.

(3) Clutch disengaged, cylinder in lower position.

In this case the oil tends to force the cylinder downwardly in Fig. 13, oil being admitted under pressure to the lower end of the cylinder through ports 164, 169 and 165, the oil exhausting at the upper end of the cylinder through ports 168 and 170. This situation occurs when it is desired to coast in high. The oil pressure acts to delay the down-shifting of the gears until the car reaches a lower speed than in the ordinary down-shift operation.

(4) Clutch disengaged, cylinder in upper position.

Here the oil pressure tends to force the cylinder upwardly in Fig. 13. Oil is admitted to the upper end of the cylinder through ports 164 and 169, the lower end of the cylinder exhausting through ports 166 and 171. This condition occurs in coasting when the car reaches a sufficiently low speed to move the cylinder.

In both cases (3) and (4), the governor lever 76 is operating with the pin 84 in the large part of the slot 80. The drum 91 has been brought to its axial position by the governor arm. To insure the cylinder remaining in this axial position, the oil, it will be noted, always acts to hold the cylinder toward the end of the casing to which it has been moved and provides a hydraulic lock for the cylinder during the shift period.

Kick-off valve operation

Referring especially now to Figs. 12, 17, 31, 32 and 33, the kick-off valve H is shown in cocked position with the nose 181 on the cam block 107 engaging the periphery of collar 177 in line with "high" slot 180, the nose 181 being wholly out of the slots 139 and notches 179, 194. When the manual collar 178 is moved out of the path of nose 183, rotation of shaft C carrying collar 177 releases the kick-off valve H.

The three-position collar 177 is shown in the high gear position. When the collar 177 rotates in the direction of the arrow in Fig. 32, for down-shifting to second, the nose 181 drops into notch 179. As collar 177 continues to rotate, nose 181 working in notch 179 moves collar 177 axially, compressing spring 187. Further rotation of collar 177 causes nose 181 to drop into second speed slot 180. This not only releases kick-off valve H, but provides a positive interlock to stop the gear shift cylinder in the correct position for engaging the gears in second.

When the kick-off valve H is cocked by engagement of the clutch, the valve bar 107 being moved to the right in Figs. 12 and 33, the spring 187 pushes the collar 177 under the nose 181, thus holding the kick-off valve H cocked until three-position collar 177 is again rotated.

When collar 177 is again rotated in the direction of the arrow in Figs. 17 and 32 for down-shifting to first speed, the nose 181 engages notch 194, forces collar 177 back against spring 187 until the nose 181 engages in low speed notch 180, thus releasing the kick-off valve again.

The cocking arrangement for kick-off valve H will be better understood by considering the operation in connection with Fig. 17. When kick-off valve H is released, the shaft B having been moved in the direction of the arrow in Fig. 17, the spring 110 engages the catches 108 and 109. To cock the kick-off valve H, the arm 114 first engages the plunger 111, storing up energy in the spring 112 which is stronger than the spring 106. The catches 108, 109 prevent the cocking of kick-off valve H until the arm 114 has moved sufficiently to engage spring 110 to release these catches. Upon the release of catches 108, 109, the spring 112 acts immediately to force the valve H to the right with instantaneous action, overcoming the force of spring 106 and moving valve H to the position shown.

Kick-off valve H may be released irrespective of rotation of three-position collar 177. Manual collar 178 is used for releasing kick-off valve H, as well as for preventing its release.

When the transmission is in low gear, the car clutch 2 disengaged and the foot off the accelerator pedal 10 and it is desired to accelerate the car, arrangement is made for depressing of the accelerator pedal to release kick-off valve H. The depressing of the accelerator pedal 10 through the control range rotates shaft D in the direction of the arrow in Fig. 17. This causes collar 211 to ride up on cam 212 and move collar 189 to the right in Fig. 15. Finger 188 on collar 189 engages flange 182 on manual collar 178 to move flange 182 from engagement with lug 183 on the cam block 107.

Movement of collar 189 to the right in Fig. 15 also moves extension 188' to the right, this engaging three-position collar 177 and disengaging the periphery of three-position collar 177 from nose 181 on cam block 107, thus completely releasing the kick-off valve H.

As control shaft D continues to rotate in the direction of the arrow in Fig. 17, collar 189 rotates with it, disengaging extension 188' from three-position collar 177, this permitting the latter to return to its engagement with cam block 107.

When the foot is raised from the accelerator pedal, accelerator pedal spring 301 returns control shaft D, extension 188' engages the edge of three-position collar 177, the pin and slot connection between pin 213 and collar 189 permitting control shaft D to continue to return under the influence of accelerator pedal spring 301 until collar 211 rides to the low position on cam 212. This permits collar 189 to move to the left in Fig. 15 and extension 188' to clear three-position collar 177, after which spring 214 rotates collar 189 until it again engages pin 213.

Clutch lock release operation

The operation of single finger 149 and double finger 147, 148 and the mechanism for controlling these fingers is as follows: (Figs. 11, 12, 15, 25, 26 and 27).

Assume the car to be in high, corresponding to the position of the parts shown in the drawings, and that mechanism executes a down-shifting operation.

The disengagement of the car clutch rotates shaft B in the direction of the arrow in Fig. 11, causing the detent 145 to engage shoulder 144. As the gear shift cylinder 6 shifts the gears into second speed, it rotates shaft C, causing finger 148 to engage nose 146, tripping detent 145 and allowing shaft B to return to the position shown in Fig. 11, permitting clutch engagement. As shaft C rotates, the lost motion between the shoulders on collars 154 and 205 permits shaft C to rotate almost to a position corresponding with engagement of the second speed gears before finger 148 trips detent 145. In down-shifting from second to first, the events above described will be repeated, except that the finger 147 engages the nose 146.

Assume now that the foot is removed from the accelerator pedal and the car is stationary with the engine idling. The gears are in low and the car clutch is disengaged, transfer shaft D has been rotated to such position that the arm 197 on collar 198 has operated forked arm 196 to rotate sleeve 153 to cause cam surfaces 199 and 200 to ride down, the spring 193 pushing sleeve 153 to the right and placing single finger 149 in the same axial position as double finger 147, 148 occupies in Fig. 15. The spring 193 pushes collars 154, 205 axially against the pressure of spring 207, the slot 208 permitting this movement.

As the accelerator is depressed by the foot to accelerate the car, rotation of shaft D rotates sleeve 153 on shaft C, causing the single finger 149 to engage nose 146, disengaging detent 145 from shoulder 144 and allowing the car clutch to engage. Further downward movement of the accelerator pedal in opening the throttle rotates shaft D and moves sleeve 153 axially to the left in Fig. 15, placing double finger 147, 148 in the axial position shown in Fig. 15.

To up-shift from first to second speeds, when the car clutch disengages, the detent 145 engages shoulder 144 and the gear shift cylinder 6 moves the gears to second speed. Just as the gears approach second speed position, the finger 147 in moving to the right in Fig. 11 engages nose 146, tripping detent 145 and permitting the clutch to engage.

In up-shifting from second to high speeds, the sequence of events above described is repeated, except that the finger 148 engages the nose 146 to disengage the detent 145 to permit engagement of the clutch for high speed.

Thus, it will be seen that on the downshift, finger 148 operates to permit clutch engagement for second, and finger 147 operates to permit clutch engagement for low. On the upshift, finger 147 operates to permit clutch engagement for second, and finger 148 operates to permit clutch engagement for high, and single finger 149 permits clutch engagement for low.

*Transfer clutch operation*

The transfer clutches 237, 238 and 235, 236 (Figs. 14 and 15) are for the purpose of transferring throttle control between accelerator pedal 10 and governor 70. For ordinary driving, the car throttle is under control of the accelerator pedal 10, but during disengagement of the car clutch 2 under ordinary conditions of upshifting and downshifting, the throttle control is transferred to the governor 70 so as to synchronize the forward clutch element of clutch 2 attached to engine 1 with the rear clutch element attached to the transmission 3. This insures engagement of car clutch 2 smoothly and without shock or jar to the mechanism of the vehicle or to its occupants.

The disengagement and engagement of the car clutch 2, therefore, is used to operate the transfer clutches, provided certain other conditions are fulfilled. For example, we do not want the governor to control the throttle (a) when the gears are in low and the car is stationary; (b) when coasting in high gear, or (c) in an emergency when it is desired to stop the car while the car clutch is being synchronized during a shifting operation.

The operation of the transfer clutches is controlled by arm 141 on clutch shaft B driving arm 142 on collar 215 on shaft D. Collar 215 must rotate sleeve 217 to operate the transfer clutches, but collar 215 will only rotate sleeve 217, provided spring 218 exerts enough pressure to keep cam engagement 216 in its low position. The pressure exerted by spring 218 is determined by two things—the axial position of tail 185 and the axial position of collar 211, spring 218 being compressed from both ends.

Tail 185 moves to the right in Figs. 14 and 15 only when gear shift shaft C takes low speed position. Rotation of pinned collar 190 to this position allows cam engagement 191, 192 to ride into low position. (See also Fig. 12.)

Collar 211 moves to the left in Figs. 14 and 15 only when transfer shaft D is rotated by the accelerator pedal 10 rising from power to free position. In this movement, collar 211 rides into low position on came 212.

The cam engagement 216 between collar 215 and sleeve 217 is of such steepness that it acts as a positive shoulder so long as spring 218 is compressed from either end or from both ends. In other words, when spring 218 is released on both ends together, the engagement 216 has cam action. When the engagement 216 has positive shoulder action, rotation of collar 215 rotates sleeve 217 with it. When the engagement 216 has cam action, rotation of collar 215 moves sleeve 217 axially without rotating it.

For ordinary down-shifting or up-shifting, we want the transfer clutches to operate and the car clutch synchronizing devices to function, excepting, of course, the conditions above noted.

In the position shown in Figs. 14 and 15, the parts are in high gear and the car throttle is under control of the accelerator pedal 10 through transfer clutch 235, 236, transfer clutch 237, 238 being disengaged. For a down-shift to second speed under power, such as caused by a bad grade, disengagement of the car clutch 2 and rotation of clutch shaft B rotates collar 215. Sleeve 217 is rotated by collar 215 (because spring 218 is compressed) causing cam engagement 220 to take a high position, moving floating collar 219 to the right in Figs. 14 and 15, pushing pinned collar 198 and shaft D also to the right, engaging transfer clutch 237, 238 and disengaging transfer clutch 235, 236.

Thus, control of the throttle is given to the governor 70, the governor acting through governor arm 78, link 82 and arm 83 to sleeve 234, arm 18 and carbureter rod 19. As the governor pin 84 is riding in the large part of the slot 80, the governor 70 is free to execute its governing action independent of drum 91.

In the above sequence of events, the rotative position of shaft D is not changed. When the shift is completed, engagement of the car clutch rotates the collar 215 back to the position shown and throttle control is transferred back to the accelerator pedal 10.

When both coasting in high and with the car stationary, the car clutch 2 is disengaged and the accelerator pedal is in free position. But the synchronizer must be inoperative in both cases. When accelerating the car in low gear from stationary, we want the car clutch to engage without synchronization. When resuming power drive in high after coasting, we want the car clutch 2 to engage with synchronization.

In the former case, raising the accelerator pedal 10 to its free position caused both cam engagement 212 with collar 211 and cam engagement 227 to take low positions, these cam engagements acting together. Since the gears have moved to low speed, tail 185 has moved to the right.

As pressure has been removed from both ends of spring 218, the clutch disengaging movement of arm 142 has caused engagement 216 to act as a cam, moving sleeve to the right in Fig. 14 without rotation, thus having no effect on the transfer clutches. Torsion of spring 218 causes cam engagement 216 to ride in high position and cam engagement 220 in low position.

Depressing the accelerator pedal 10 rotates transfer shaft D, causing cam engagement 212 with collar 211 and cam engagement 227 to ride to high position, but synchronizing action does not take place as cam engagement 216 is still riding high and cam engagement 220 is riding low.

In the case of coasting in high, raising the accelerator pedal 10 to its free position causes both cam engagement 212 with collar 211 and cam engagement 227 to take low positions.

As there is still pressure on spring 218, the clutch disengaging movement of arm 142 has caused engagement 216 to act as a shoulder, rotating sleeve 217. However, as cam engagements 212 and 227 are riding low, rotation of sleeve 217, causing cam engagement 220 to ride high, has no effect on the transfer clutches.

Depressing the accelerator pedal 10 to resume power drive in high starts the synchronizer, since rotation of the transfer shaft D causes cam engagements 212 and 227 to ride high. Since cam engagement 220 is already riding high, the transfer clutch 237, 238 will engage and transfer clutch 235, 236 will disengage, thus giving throttle control to governor 70.

Engagement of the car clutch 2 rotates collar 215 and sleeve 217 back to the position shown in Fig. 14, causing cam engagement 227 to take low position, operating the transfer clutches to give throttle control back to the accelerator pedal 10.

Provision is made for giving throttle control back to the accelerator pedal 10 any time irrespective of the condition of transmission change, simply by removing the foot from the accelerator pedal. As the accelerator pedal 10 rises to uppermost free position, rotation of shaft D brings engagement 212 to low position operating the transfer clutches to disengage the synchronizer, giving throttle control back to the accelerator pedal. Transfer of the throttle control back to the accelerator pedal will take place even if the foot be removed from the accelerator pedal 10 before a shift cycle is completed.

Provision must also be made to insure the removal of the influence of spring 239 on engagement 216 which would otherwise sometimes occur. Assume, for example, that it is desired to stop the car suddenly while downshifting from second gear to low gear under power, before the gear shift is completed.

Clutch 2 being disengaged and the foot still on the accelerator pedal 10, engagement 216 has acted as a shoulder rotating sleeve 217 and causing engagement 220 to ride high. Engagements 227 and 212 are also in high position and the transfer clutches have operated to give the throttle control to the governor.

Removal of the foot from the accelerator pedal 10 to stop suddenly rotates shaft D, bringing engagement 212 to low position. This operates the transfer clutches to disengage the synchronizer, giving throttle control back to the accelerator pedal 10 even before the gears shift to low. After downshift to low gear takes place, tail 185 moves axially by cam engagement 191, 192 on shaft C, going to low position. This releases compression on spring 218. Since cam engagement 227 has moved to low position (by rotation of shaft D) pressure of spring 239 is removed from cam engagement 216 and spring 218 is free to rotate sleeve 217 moving cam engagement 220 to low position and cam engagement 216 to high position. Thus, cam engagement 227 riding to low position is effective in removing the pressure of spring 239 from engagement 216 so that the latter can have cam action when pressure is removed from both ends of spring 218.

*Operation of car*

In the operation of the car, it will be understood from Fig. 1 that accelerator pedal 10 has two ranges of movement; an upper or control range and a lower or power range. In the upper range, the car throttle is not operated but shaft D is rotated to perform all functions its rotation is intended to cause. In the lower range, shaft D is rotated and the car throttle is controlled, but this rotation of shaft D does not initiate any events. The top of the upper range of the accelerator pedal movement is called, for convenience, the free position. The top of the lower range of the accelerator pedal movement is called the power position.

*Order of events—coasting to a stop from high*

Taking foot all the way off accelerator pedal rotates shaft D. Accelerator pedal rising to top of power range closes throttle. Rising from top of the power range to the top of the control range, it actuates the following devices on shaft D.

Rotation of shaft D performs the following operations:

Closes throttle.

Collar 211 rides down boss 212 and moves collar 215 and sleeve 217 to left in Fig. 15.

Collar 189 follows collar 211 axially and causes manual abutment on collar 178 to move into the path of lug 183 on kick-off valve H (Fig. 12).

Opens valve M on shaft D.

Rotates sleeve 153 on C, putting single clutch release finger 149 into position and pushing double finger 147, 148 out of the way (Fig. 15).

Collar 198 rides to low position simultaneously with collar 211.

Opening of valve M moves clutch cylinder 5 to disengage car clutch 2. (Vacuum obtained from manifold 22, pipes 255, 104, valve H, pipe 119, valve M, pipes 256, 105. Cylinder 5 draws air through pipe 262, check valve 261.)

Moving of clutch cylinder 5 rotates shaft B and does the following:

Disengages car clutch 2.

Seats clutch lock 145 (Fig. 11).

Upshift valve T does not operate because held by lug 122 on C (Fig. 19).

Downshift valve 5 does not operate because drum 91 not in proper position (Figs. 12, 20).

Arms 141, 142 (Fig. 14) rise, rotating sleeve 217 since tail 185 still exerts pressure on spring 218, but synchronizer does not cut in because collars 198 and 211 are on low point.

Car coasts in high, slowing down. When a sufficiently low car speed is reached, the governor 70 moves drum 91 on B upwardly in Fig. 13, the governor pin 84 riding in large part of slot 80.

Down-shift valve S operates, actuating gear shift cylinder 6. (Vacuum applied to cylinder 6 through pipes 255, 104, valve H, pipe 119, valve S, pipe 258. Air is drawn into cylinder 6 through pipe 257, valve S).

Gear shift cylinder 6 shifts directly to low because manual abutment 182 on collar 178 (Fig. 12) in the path of kick-off valve H prevents this valve from seating in the slots of the three-position collar 177.

Down-shift of gear shift cylinder 6 rotates shaft C which operates the following devices:

Opens valve N on shaft C, but nothing happens.

Three-position collar rotates, but manual abutment on collar 178 prevents kick-off valve H from operating.

Lug 122 on shaft C releases up-shift valve T, but T does not move because drum 91 has moved to upper position in Fig. 13.

Pinned cam 190 on C rotates, doing nothing until low speed position is reached, when it releases tension on spring 218, this rendering synchronizer inoperative since pressure on spring 218 is released at both ends. Removal of pressure from both ends of spring 218 permits torsion of spring 218 to rotate sleeve 217, causing cam 216 to ride in high position and cam 220 in low position.

Gear shifts to low speed.

The car coasts to a standstill aided by the foot brake, if desired, the parts retaining this position with the gears in low and the clutch 2 disengaged.

*Order of events—acceleration from previous stop*

The gears are in low with the car clutch 2 disengaged and the foot entirely off the accelerator pedal 10, and it is desired slowly to accelerate car to high gear.

Accelerator pedal is now depressed from the top to the bottom of the control range and into the power range, this rotating transfer shaft D, but not operating the throttle.

Rotation of shaft D operates the following:

Inner collar 211 rides up boss 212 moving collar 215, sleeve 217, floating collar 219 axially to the right in Fig. 15. Cam 227 also rides to high position, but synchronizer transfer does not take place because cam 216 is still riding high and cam 220 is still riding low from previous stop.

Axial movement of collar 211 moves collar 189 axially to remove manual control on collar 178 to disengage lug 183, removing manual lock from kick-off valve H.

Axial movement of collar 189 causes extension 188' to engage three-position collar 177, disengaging the periphery of collar 177 from lug 181, permitting lug 181 to enter low speed slot 180, releasing kick-off valve H.

Releases clutch lock 145 through single finger 149 on sleeve 153 on shaft C.

Closes valve M on D.

Kick-off valve H operates the clutch cylinder 5 to engage the car clutch. Vacuum is removed from cylinder 5 by closing of valve M. Air is supplied to clutch cylinder 5 through pipe 105, atmosphere port of valve H. Air under the piston of cylinder 5 exhausts through pipe 260 and leaky connection between flange 90 and casing 152, acting as a dash pot for the clutch 2.

Movement of clutch cylinder 5 rotates shaft B and operates the following:

Cocks downshift valve S (Fig. 20).

Cocks kick-off valve H (Fig. 17).

Cam 216 rides to low position, but this has no effect on the transfer clutches.

Car clutch 2 engages without synchronization.

Car accelerates in low until speed is sufficient to cause governor 70 to move drum 91 on B downwardly in Fig. 13.

Downward movement of drum 91 operates valve L to position shown in Fig. 21.

Operation of valve L gives vacuum to the clutch cylinder 5 through pipes 255, 104, valve H, pipe 119, valve N, valve L, pipe 105.

Opening movement of clutch cylinder 5 rotates shaft B and operates the following.

Moves arms 141, 142 upwardly in Fig. 14, rotating sleeve 217, since spring 218 is under compression. Cam 220 rides high, engaging transfer clutch 237, 238 and disengaging transfer clutch 235, 236, putting car under control of synchronizer.

Disengages car clutch.

Operates up-shift valve T since stop 122 only acts in high.

Up-shift valve T operates gear shift cylinder 6. Vacuum is led to cylinder 6 through pipes 255, 104, valve H, pipe 119, valve T, pipe 257. Air is led to cylinder 6 through pipe 258, valve T, atmosphere port 120.

Engages clutch lock 145.

Operation of gear shift cylinder 6 rotates shaft C and does the following:

Shifts gears from first to second. As soon as gears shift to second, the governor slows down. This tends to move drum 91 upwardly in Fig. 12, but the drum is locked against upward axial movement by release of upshift valve T.

Releases kick-off valve H at second speed notch 180 in three-position collar 177.

Finger 147 on collar 154 releases clutch lock 145.

Closes valve N on shaft C.

Release of kick-off valve H does the following:

Removes vacuum from gear shift cylinder 6, stopping it.

Supplies atmosphere to clutch cylinder 5 to engage car clutch through pipe 105, atmosphere port 115.

Closing movement of clutch cylinder 5 rotates shaft B and does the following:

Operates transfer clutches to return throttle control to accelerator pedal.

Clutch engages with synchronization.

Cocks kick-off valve H.

Cocks upshift valve T. Cocking of upshift valve T releases drum 91 so that the governor may move it midway to its upper position.

Car accelerates in second until a sufficiently high speed is reached to cause the governor to move the drum on B downwardly, setting in motion a sequence of events similar to that above described for the purpose of shifting from second to high.

The above description applies to slow acceleration. For quick get-away, the sequence of events is the same except that the car speed at which the governor 70 will move drum 91 on shaft B downwardly in Fig. 13 will be higher depending upon how far the accelerator pedal 10 is depressed and how much vacuum is lost in manifold 22. At any rate, the loss of vacuum causes the oil pressure in oil cylinder 94 on B to increase, opposing the action of the governor 70 as explained above in connection with the oil cylinder 94.

*Order of events—down-shifting*

Assume the car is traveling in high and that the accelerator pedal is depressed all the way down to the floor in an effort to make a heavy grade in high. But, the hill is too steep and down-shifting is required.

As the car slows down, the governor 70 shifts the drum 91 on B upwardly in Fig. 13. The increased oil pressure due to loss of vacuum in the intake manifold 22 also tends to shift the drum on B upwardly. Consequently, the drum on B will move upwardly at a higher car speed than if the car were merely slowing down to a stop on a level road.

Upward axial movement of the drum on B in Fig. 13 operates valve L, admitting vacuum to the clutch cylinder 5. The opening movement of the clutch cylinder 5 rotates clutch shaft B and operates the following devices:

Operates arm 142 upwardly in Fig. 14, rotating collar 215 on D.

Rotation of collar 215 also rotates sleeve 217 (Fig. 14) since spring 218 is under compression.

Cam 220 rides to high position, moving floating collar 219 and the entire shaft D axially to engage transfer clutches 237, 238 and disengage transfer clutch 235, 236, giving throttle control to the governor.

Disengages car clutch 2.
Operates clutch lock 145.
Operates down-shift valve S.

Up-shift valve T does not operate because drum 91 is not in proper position and because of stop 122 (Fig. 12).

Down-shift valve S operates the gear shift cylinder 6, rotating gear shift shaft C.

Down-shifting of gear shift cylinder 6 rotates shaft C and operates the following:

Opens valve N which does nothing since valve L has operated.

Rotates three-position collar 177, releasing kick-off valve H at second speed notch 180 (Figs. 32 and 33).

Lug on C releases upshift valve T, but T does not operate because drum on B is not in proper position.

Gears shift to second. This increases governor speed which tends to move drum 91 downwardly in Fig. 12, but the drum is locked against downward axial movement by release of down-shift valve S.

Releases detent 145 by rotation of finger 148 (Fig. 11).

Operation of kick-off valve H does the following:

Stops gears shift cylinder 6 at second speed.
Gives atmosphere to clutch cylinder 6, causing it to close.

Closing movement of clutch cylinder 5 rotates the clutch shaft B, operating the following devices:

Car clutch engages.
Cocks kick-off valve H.
Cocks downshift valve S. This releases drum 91 so that the governor may move it midway to its lower position.

Operates transfer clutches to give throttle control back to accelerator pedal.

Car now proceeds in second with the accelerator pedal depressed to give sufficient power to make the grade. If the grade is so steep that it cannot be made even in second, the slowing down of the governor will cause automatic downshift to first, the sequence of events being similar to that described above.

In the above description, the car speed at which the governor 70 shifts the drum 91 on B upwardly in Fig. 13 is higher than would be the case if the car were not making a heavy grade, but simply slowing down under power. The car speed at which down-shifting takes place depends upon the vacuum in manifold 22, which in turn controls the oil pressure in cylinder 94. The less the vacuum in manifold 22, the greater the oil pressure in cylinder 94 and the greater the tendency of the pressure to move the drum 91 upwardly in Fig. 13.

When down-shifting on the level under power, the events are the same as above described, except that there is little loss of vacuum in manifold 22 and consequently low oil pressure in oil cylinder 94. Therefore, the car speeds at which down-shifting takes place will be lower.

*Coasting or using engine as brake in high*

If it is desired to coast in high, say, when going at a speed of fifty miles an hour, the foot is removed from the accelerator pedal 10, causing it to rise to its free position. This causes the car clutch 2 to disengage, without operation of the synchronizer, the throttle to close, and the same sequence of events described under "Coasting to a Stop from High," except that the car does not slow down sufficiently to cause the governor 70 to move drum 91 on B upwardly in Fig. 13.

When it is desired to resume power drive in high, the accelerator pedal 10 is depressed, this starting the synchronizer working since rotation of transfer shaft D causes cam engagements 212 and 227 to ride into high position. Since the cam engagement 220 is already riding high (due to engagement 216 acting as a shoulder), the transfer clutch 237, 238 will engage and transfer clutch 235, 236 will disengage, giving throttle control to the governor 70.

After the engine speed has reached car speed, the car clutch 2 engages, being operated by kick-off valve H, which has been released by the manual collar 178. Operation of kick-off valve H supplies air to clutch cylinder 5 through pipe 105 and atmosphere port 115.

Operation of clutch cylinder 5 rotates shaft B which rotates collar 215 and sleeve 217 back to the position shown in Fig. 14, causing the cam engagement 220 to take low position and operating the transfer clutches to give the throttle control back to the accelerator pedal 10.

The car is now back in high, the clutch engaged, driving under power.

If it is desired to cut off power from the engine, leaving the car in high and using the engine as a brake, the accelerator pedal 10 is permitted to rise only to the top of the power range, the foot holding the accelerator pedal in this position. The car clutch 2 remains engaged here because, although shaft D rotates, the mechanism, operable by its rotation, operates only when the accelerator pedal moves in its control range.

*Starting car and parking*

When the car is permitted to come to rest either by coasting or by downshifting, it comes to rest with the engine idling, with the gears in low, and with the car clutch 2 disengaged. If the engine ignition be turned off, the vacuum in clutch cylinder 5 will be lost but the clutch 2 will not engage because it is held by clutch lock 145 (Fig. 11). When the car comes to rest with the gears in low, the knob 9 will be in the "in" position in Fig. 1. It is preferable, when parking, to pull out the knob to the solid position, thus placing the gears in neutral.

To start the engine, the knob 9 should preferably be left in the position shown in heavy lines in Fig. 1 with the gears in neutral, so that the car cannot start up if the accelerator pedal is accidentally depressed. The starting up of the engine 1 will supply vacuum to the clutch cylinder 5 and gear shift cylinder 6.

To go forward, the knob 9 is then pushed in to the dotted position in Fig. 1, causing the gears to go to low position. Then it is only necessary to depress the accelerator pedal 10 to proceed as described under "Acceleration from Previous Stop."

Figure 2:
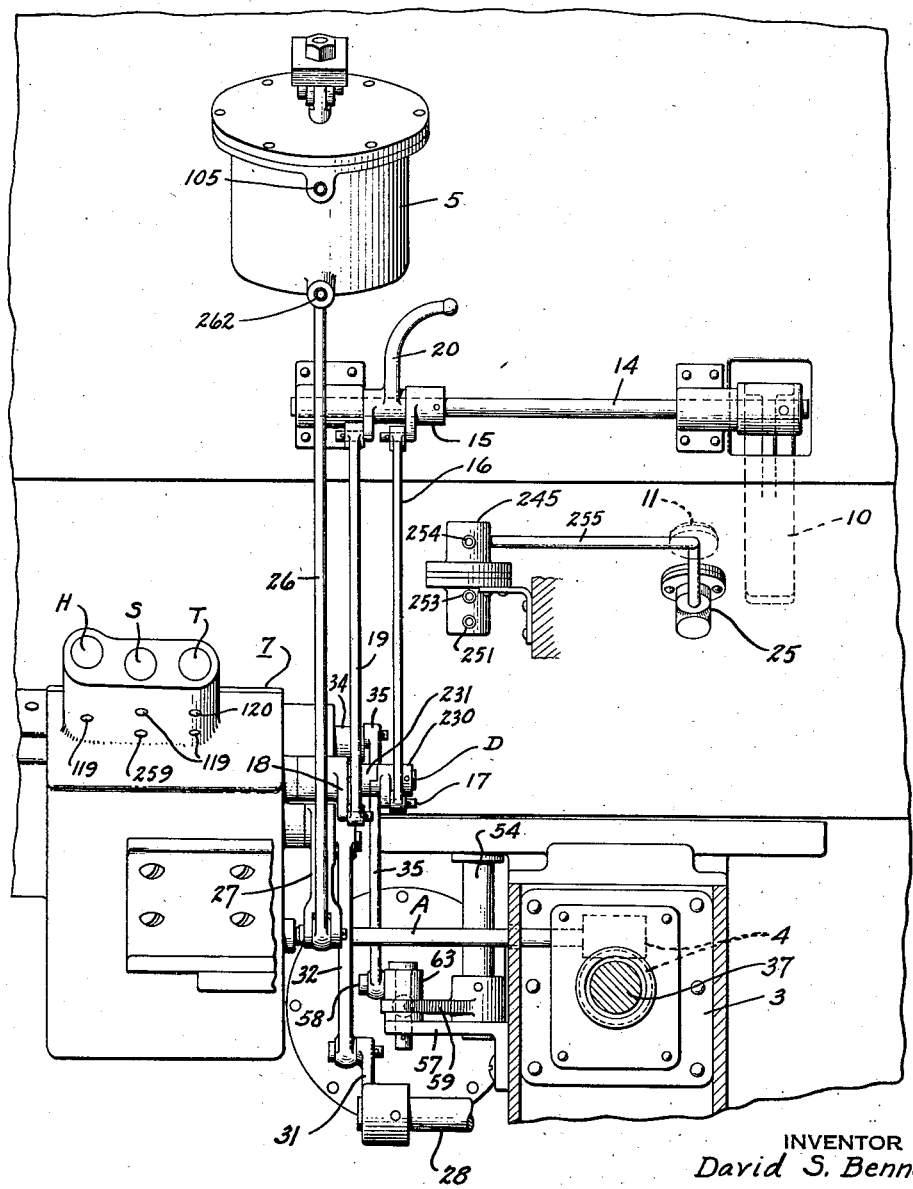
Fig. 2 is a transverse section looking rearwardly taken on the line 2—2 of Fig. 1.
Figure 4:
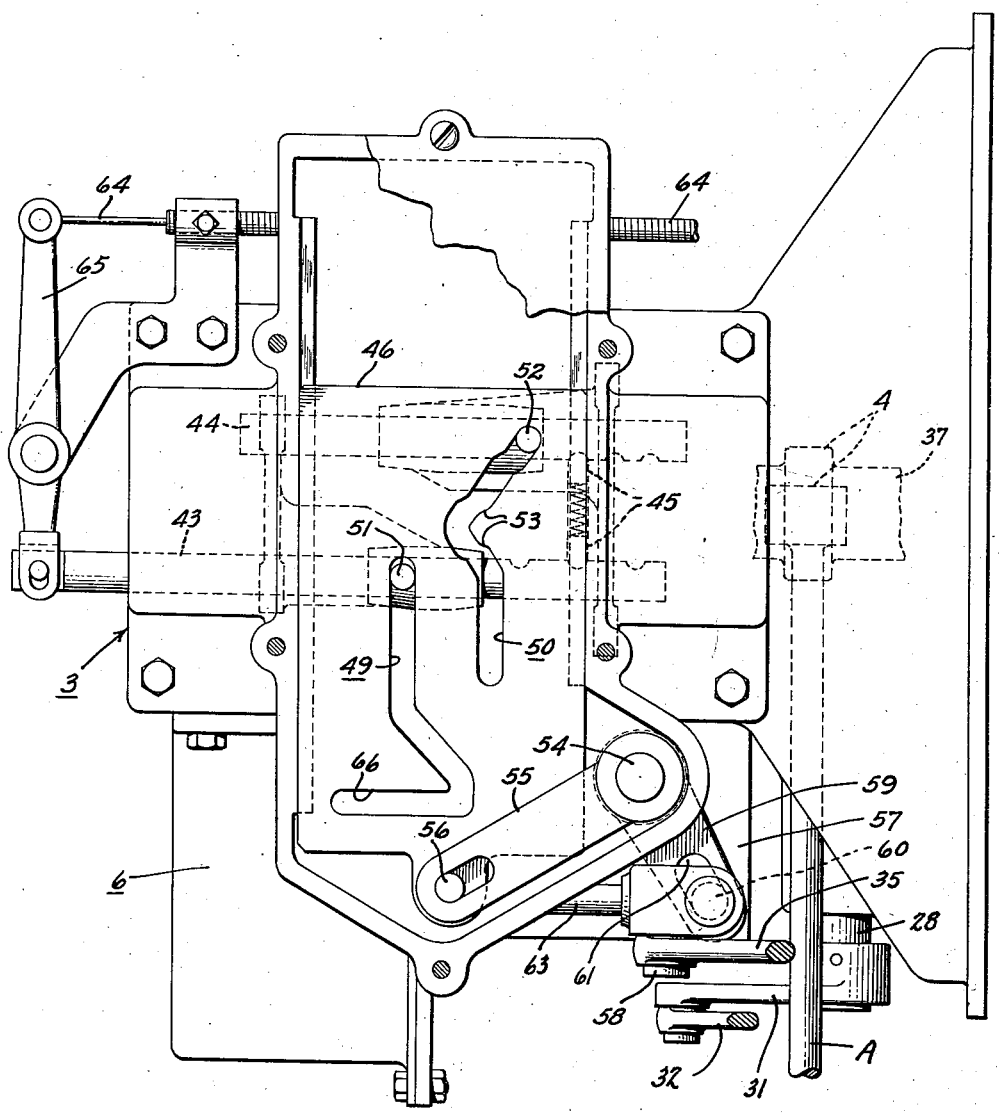
Fig. 4 is a top plan view of the gear box showing adjoining controls.

To operate the car in reverse, the knob 9 is pulled out to the rear dotted position shown in Fig. 1 which manually engages the gears in reverse. Depressing the accelerator pedal 10 will cause the same sequence of events described under "Acceleration from Previous Stop," except that the gear shift cylinder 6 will not be operated because cam plate 46 will be locked by the follower 51 at the end of slot 66 for reverse gear (Fig. 4).

*Advantages and comments*

Thus, a full automatic gear shifter is provided which is completely self-acting, responding to conditions of car speed and engine torque. The only voluntary action required by the operator is the depressing of the accelerator pedal in accordance with the speed desired. The transmission may be said to have a "mechanical brain" determining, independent of the operator, the car speeds for up-shifting and down-shifting.

It will be noted that the points of up-shifting and down-shifting are not at fixed car speeds, but are variable, depending upon the torque called for. For quick acceleration, the up-shift from first to second and the up-shift from second to high takes place at higher car speeds than for slow acceleration. For example, for quick acceleration, the up-shift from first to second may take place at eight to ten miles per hours, and the upshift from second to high may take place at thirty to thirty-five miles per hour. For slow acceleration, the up-shift from first to second may take place at two or three miles per hour, and the up-shift from second to high may take place at eight to ten miles per hour.

The action of the transmission is also governed by the steepness of grade. When ascending a particularly heavy grade, the car speed decreases and the down-shifting to second takes place at a higher car speed than would ordinarily take place in slow deceleration under power on the level. Similarly, the down-shift from second to first on a bad grade takes place at a relatively higher car speed. For example, the down-shift to second on a heavy grade may take place at thirty miles per hour and the down-shift to first may take place at ten miles per hour. On the other hand, when slowing down under power on a level, the car may continue in high until it slows down to, say, ten miles per hour or even less before down-shifting to second takes place. Likewise, when proceeding on the level, the car may slow down to two or three miles per hour before down-shifting from second to first takes place.

Provision is made for taking care of all conditions met on the road. By permitting the accelerator pedal to rise to the top of power range, the car may proceed in high using the engine as a brake. If the foot is entirely removed from the accelerator pedal, permitting it to rise to the top of the control range, the car coasts. If it be desired for any reason to proceed in any particular gear without automatic operation, it is only necessary to press the status quo button which will keep the transmission in whatever condition it happens to be in at the instant. For example, if it is desired to go down a hill in second, it is only necessary to slow down the car by the foot brake until the transmission automatically down-shifts to second and then depress the status quo button, and the car will remain in second irrespective of car speed.

The automatic synchronization of the clutch elements before engagement insures smooth shifting without shock or jar to the mechanism or to the occupants of the vehicle. This synchronization is entirely automatic in any shifting operation and also when resuming power drive in high after coasting. The automatic governor control of the carbureter, however, is not required when shifting into low from a standstill. Provision is made, however, that the throttle control, given to the governor for synchronizing purposes, may be removed at any time by merely removing the foot from the accelerator pedal.

While certain novel features of the invention have been disclosed and are pointed out in the annexed claims, it will be understood that various omissions, substitutions and changes may be made by those skilled in the art without departing from the spirit of the invention.

What is claimed is:

1. In an automotive transmission system, an internal combustion engine, a mechanical clutch, a stepped, shifting gear type transmission, an accelerator pedal, a throttle, a clutch cylinder for operating the clutch, a gear shift cylinder for shifting the gears, a control device comprising a governor connected to a point between said clutch and transmission, a clutch shaft rotatable with movement of said clutch cylinder, a gear shift shaft rotatable with movement of said gear shift cylinder, a transfer shaft connected to the accelerator pedal, to the throttle and also to the governor, said transfer shaft having transfer clutches for transferring control of the throttle between said accelerator pedal and governor, mechanism controlled by rotation of said clutch shaft for operating said transfer clutches, mechanism operated by said governor for shifting said clutch shaft axially, means whereby axial movement of said clutch shaft operates the clutch cylinder, means whereby rotation of said clutch shaft operates the gear shift cylinder, means whereby rotation of the gear shift shaft operates the clutch cylinder and the gear shift cylinder, means for disconnecting said governor from said clutch shaft upon rotation of the latter to permit said governor to operate upon said transfer shaft.

2. In an automotive transmission, an internal combustion engine having a throttle, a mechanical clutch having driving and driven elements, said driving clutch element being connected to said engine, a transmission having shiftable gears connected to said driven clutch element, a propeller shaft driven by said transmission, a governor responsive to the speed of said propeller shaft, an operator's control member, a transfer device connected to said throttle and respectively to said governor and operator's control member, mechanism for shifting said gears and operating said clutch, said mechanism also operating said transfer device to transfer control of the throttle from the operator's member to the governor to synchronize said clutch elements before engagement.

3. In an automotive transmission, a prime mover having a power control, a load shaft, a mechanical clutch having driving and driven elements and a transmission having shiftable gears between said prime mover and load shaft, a governor responsive to the speed of said load shaft, an operator's control member, a transfer device connected to said power control and respectively to said governor and operator's member, mechanism for shifting said gears and operating said clutch, said mechanism also operating said transfer device to transfer control of the power control from the operator's member to the governor to synchronize said clutch elements before engagement.

4. In an automotive transmission, an internal combustion engine having a throttle, a mechanical clutch having driving and driven elements, said driving clutch element being connected to said engine, a transmission having shiftable gears connected to said driven clutch element, a propeller shaft connected to said transmission, a speed responsive governor connected to said driven clutch element, an operator's control member, a transfer device connected to said throttle and respectively to said governor and to said operator's control member, automatic mechanism responsive to said governor for shifting gears and operating said clutch at predetermined speeds of said propeller shaft, said mechanism also operating said transfer device to transfer control of the throttle from the operator's member to said governor to synchronize said clutch elements before engagement.

5. In an automotive vehicle, an internal combustion engine having a throttle, a propelling element, a stepped gear shift transmission connected to said propelling element and a mechanical clutch between said transmission and said engine, an operator's member controlling said throttle, said operator's member having a range of power movement for controlling the power generated by said engine, automatic mechanism responsive to speed of said propelling element automatically operative while said operator's member is in the power range, for shifting said gears and operating said clutch, and transfer devices connected to said throttle and respectively to said operator's member and to said governor operated by said automatic mechanism to transfer control of said throttle from said operator's member to said governor to synchronize said clutch elements before engagement.

6. In an automotive vehicle, an internal combustion engine having a throttle, a propelling element, a gear shift transmission connected to said propelling element and a mechanical clutch between said transmission and said engine, an accelerator pedal controlling said throttle, said accelerator pedal having a range of power movement for controlling the power generated by said engine, automatic mechanism responsive to speed of said propelling element automatically operative, while said accelerator pedal is in the power range, for shifting said gears and operating said clutch, and an accelerator pedal foot rest for preventing the operation of said automatic mechanism.

7. In an automotive vehicle, a prime mover having a power control element, a propelling element, a gear shift transmission, and a mechanical clutch between said propeller shaft and said prime mover, an accelerator pedal controlling said control element, automatic mechanism responsive to speed of said propelling element automatically operative for shifting said gears and operating said clutch, and a foot rest for said accelerator pedal to prevent operation of said automatic mechanism.

8. In an automotive vehicle, a prime mover having a power control element, a propelling element, a gear shift transmission, and a mechanical clutch between said propeller shaft and said prime mover, an accelerator pedal controlling said control element, automatic mechanism responsive to speed of said propelling element automatically operative for shifting said gears and operating said clutch, and an auxiliary member yieldably held in operative position for a foot rest for said accelerator pedal and depressible to prevent operation of said automatic mechanism.

9. In an automotive vehicle, an internal combustion engine having an intake manifold and a throttle, a mechanical clutch connected to said engine, a gear shift transmission driven by said clutch, a load shaft driven by said transmission, an operator's member for controlling the opening of said throttle, a speed governor responsive to the speed of said load shaft, an automatic system under control of said governor for shifting said transmission and operating said clutch at predetermined vehicle speeds, a vacuum device responsive to the amount of vacuum in said intake manifold, means combining the forces exerted by said vacuum device and by said governor whereby said predetermined shift points occur at higher vehicle speeds when the vacuum in the intake manifold is low.

10. In an automotive system, an internal combustion engine having an intake manifold, a clutch driven by said engine, a gear shift transmission driven by said clutch and having a shift member for shifting the gears, a load shaft driven by said transmission, a clutch vacuum cylinder for disengaging said clutch, a shift vacuum cylinder for shifting the gears, said vacuum cylinders being connected to said intake manifold, valve means for controlling the vacuum applied to said cylinders, an interlocking device connected with said clutch and with said shift member comprising an element movable with said clutch and an element movable with said shift member, said elements having interlocking connections whereby the clutch is locked in disengaged position until said gears engage and the shifting movement of said gears disengages said elements, thereby permitting engagement of the clutch.

11. In an automotive system, a load shaft, an internal combustion engine having an intake manifold, a clutch and a gear shift transmission between said engine and said load shaft, said transmission having a shift member for shifting the gears, a clutch vacuum cylinder for disengaging said clutch, a shift vacuum cylinder for shifting the gears, said vacuum cylinders being connected to said intake manifold, valve means for controlling the vacuum applied to said cylinders, an interlocking device connected with said clutch and with said shift member comprising an element movable with said clutch and an element movable with said shift member, said elements having interlocking connections whereby the clutch is locked in disengaged position until said gears engage and the shifting movement of said gears releases, said interlocking device thereby permitting the clutch to engage.

12. In an automotive system, a prime mover, a load shaft driven thereby, a clutch and a gear shift transmission between said prime mover and said load shaft, said transmission having a shift member for shifting the gears, power devices for disengaging said clutch and for shifting the gears, and a safety positively interlocking device comprising an element movable with said clutch and an element movable with said shift member, said elements having interlocking connections for preventing engagement of said clutch until said gears are engaged.

13. In an automotive vehicle, an internal combustion engine having a throttle, a propeller shaft, a gear shift transmission connected to said propeller shaft and a mechanical clutch between said transmission and said engine, an operator's member controlling said throttle, said operator's member having a range of power movement for controlling the power generated by said engine, a speed governor responsive to speed of said propeller shaft, automatic mechanism responsive to said governor automatically operative, while said operator's member is in the power range, for shifting said gears and operating said clutch at predetermined vehicle speeds, and devices responsive to the effect of torque transmitted by said propeller shaft modifying the action of said speed governor to cause the shift points to occur at higher vehicle speeds when the torque is high.

14. In an automotive transmission, an internal combustion engine having a throttle, a load shaft driven by said engine, a disengageable device between said engine and load shaft for determining the power transfer therebetween, said device comprising a driving element connected to said engine and a driven element connected to said load shaft, a governor responsive to the speed of said driven element, an operator's control member, a transfer device connected to said throttle and respectively to said governor and operator's member, mechanism for operating said disengageable device, said mechanism also operating said transfer device to transfer regulation of said throttle from said operator's member to said governor to synchronize the elements of said device before engagement.

15. In a transmission, a prime mover, a load shaft driven by said prime mover, a disengageable device between said prime mover and load shaft for determining the power transfer therebetween, said device comprising a driving element connected to said prime mover and a driven element connected to said load shaft, a governor responsive to the speed of said driven element, prime mover control, an operator's control member, a transfer device connected to said prime mover control and respectively to said governor and operator's member, mechanism for operating said disengageable device, said mechanism also operating said transfer device to transfer regulation of said prime mover control from said operator's member to said governor to synchronize the elements of said device before engagement.

16. In an automotive transmission, a prime mover having a control device for controlling the speed thereof, a clutch having engageable driving and driven elements, said driving element being connected to said prime mover, a gear shift change speed device driven by said driven clutch element, a load shaft driven by said change speed device, a speed responsive governor driven by said driven clutch element, connections between said governor and said prime mover control to place said prime mover control under regulation by said governor to make the speed of said driven clutch element correspond to the speed of said driving clutch element irrespective of the gears in engagement to synchronize the clutch elements before engagement.

17. In an automotive transmission, a prime mover having a control device for controlling the speed thereof, a clutch having engageable driving and driven elements, said driving element being connected to said prime mover, a gear shift change speed device driven by said driven clutch element, a load shaft driven by said change speed device, a clutch synchronizer comprising a centrifugal governor responsive to change in the speed of said load shaft, means including connections between said governor and said prime mover control to place said prime mover control under regulation by said governor to make the speed of said driving clutch element correspond to the speed of said driven clutch element irrespective of the gears in engagement, and automatic shifting mechanism for automatically completing a speed changing cycle, said mechanism operating said clutch, changing said gears and putting said synchronizer into operation, all in predetermined sequence, to synchronize said clutch elements.

18. In an automotive transmission, a prime mover having a control device for controlling the speed thereof, a clutch having engageable driving and driven elements, said driving element being connected to said prime mover, a gear shift change speed device driven by said driven clutch element, a load shaft driven by said change speed device, a clutch synchronizer comprising a centrifugal governor driven by said driven clutch element, connections between said governor and said prime mover control to place said prime mover control under regulation by said governor to make the speed of said driving clutch element correspond to the speed of said driving clutch element irrespective of the gears of said change speed device in engagement, and automatic shifting mechanism for automatically completing a speed changing cycle, said mechanism operating said clutch, changing said gears and putting said synchronizer into operation, all in predetermined sequence, to synchronize the clutch elements before engagement.

19. In an automotive transmission, a prime mover having a control device for controlling the speed thereof, a load shaft driven by said prime mover, a multiposition change speed device between said prime mover and said load shaft, an operator's member for operating said control device, a prime mover synchronizer for synchronizing said prime mover and said load shaft at each of a plurality of change speed positions, said synchronizer comprising a centrifugal governor responsive to change in the speed of said load shaft, connections between said governor and said control device to place said control device under regulation by said governor to make the speed of said prime mover correspond to the speed of said load shaft, a transfer device for selectively transferring operation of said control device between said governor and said operator's member, automatic shifting mechanism for automatically completing a speed changing cycle, said mechanism changing the speed and causing said transfer device to connect said control device to said governor.

20. In a transmission, a prime mover, a load shaft driven by said prime mover, a disengageable power transmitting device between said prime mover and load shaft, a governor responsive to the speed of said load shaft, a prime mover control, an operator's control member, a transfer device comprising a first member connected to said prime mover control, a second member connected to said operator's control member, a third member connected to said governor, a transfer member slidable on said first member, mechanism for operating said disengageable device, said mechanism also operating said transfer member to selectively engage said first member with said second member or said third member, whereby to transfer operation of said prime mover control between said operator's member and said governor.

DAVID S. BENNETCH.